US007233923B1

(12) United States Patent
Wallace et al.

(10) Patent No.: US 7,233,923 B1
(45) Date of Patent: Jun. 19, 2007

(54) SYSTEMS AND METHODS FOR MATCHING DESIRED PURCHASES AND SALES OF MIS-MATCHED ITEMS

(75) Inventors: Roy Wallace, Wyckoff, NJ (US); Timothy D. Jones, Morristown, NJ (US); Weibin Wang, Orangeburg, NY (US); Andrew C. Gilbert, Califon, NJ (US)

(73) Assignee: Espeed, Inc., New York, NY (US)

( * ) Notice: Subject to any disclaimer, the term of this patent is extended or adjusted under 35 U.S.C. 154(b) by 0 days.

(21) Appl. No.: 09/564,772

(22) Filed: May 3, 2000

Related U.S. Application Data

(60) Provisional application No. 60/176,200, filed on Jan. 14, 2000.

(51) Int. Cl.
*H06Q 40/00* (2006.01)

(52) U.S. Cl. .......................................... 705/37; 705/36

(58) Field of Classification Search ............. 705/10–42
See application file for complete search history.

(56) References Cited

U.S. PATENT DOCUMENTS

| | | | | |
|---|---|---|---|---|
| 4,412,287 | A | 10/1983 | Braddock, III | 364/408 |
| 5,077,665 | A | 12/1991 | Silverman et al. | 364/408 |
| 5,136,501 | A | 8/1992 | Silverman et al. | 364/408 |
| 5,655,088 | A | 8/1997 | Midorikawa et al. | 395/237 |
| 5,715,402 | A | 2/1998 | Popolo | 395/237 |
| 5,727,165 | A | 3/1998 | Ordish et al. | 395/237 |
| 5,764,975 | A | 6/1998 | Taniguchi et al. | |
| 5,794,219 | A | 8/1998 | Brown | 705/37 |
| 5,905,975 | A | 5/1999 | Ausubel | 705/37 |
| 5,924,082 | A | 7/1999 | Silverman et al. | 705/37 |
| 5,924,083 | A | 7/1999 | Silverman et al. | 705/37 |
| 5,926,793 | A | 7/1999 | de Rafael et al. | 705/5 |
| 5,950,176 | A | 9/1999 | Keiser et al. | 705/37 |
| 6,016,483 | A | 1/2000 | Rickard et al. | 705/37 |
| 6,021,398 | A * | 2/2000 | Ausubel | 705/37 |
| 6,067,532 | A * | 5/2000 | Gebb | 705/37 |

(Continued)

FOREIGN PATENT DOCUMENTS

EP 0 407 026 A2 * 1/1991

(Continued)

OTHER PUBLICATIONS

"Risk and controls of derivatives usage", Internal Auditor v54n2 PP: Apr. 1997, Dialog file 15, Accession No. 01407676.*

(Continued)

*Primary Examiner*—Frantzy Poinvil
(74) *Attorney, Agent, or Firm*—Antonio Papageorgiou

(57) ABSTRACT

The present invention is systems and methods for matching desired purchases and sales of mis-matched items. These systems and methods compare the requirements of potential buyers and sellers of items against those of sets of other potential buyers and sellers of items to construct transaction sets that will enable an optimal transaction or set of transactions for the parties involved. The present invention may be used to match purchases and sales of any items, such as goods, services, financial instruments, and property interests (e.g., ownership interests in real property, possessory interests in personal property, etc.).

28 Claims, 22 Drawing Sheets

U.S. PATENT DOCUMENTS

| | | | | |
|---|---|---|---|---|
| 6,098,051 | A * | 8/2000 | Lupien et al. | 705/36 R |
| 6,112,189 | A | 8/2000 | Rickard et al. | 705/37 |
| 6,131,087 | A | 10/2000 | Luke et al. | 705/26 |
| 6,141,653 | A | 10/2000 | Conklin et al. | 705/80 |
| 6,317,727 | B1 | 11/2001 | May | 705/37 |
| 6,343,278 | B1 | 1/2002 | Jain et al. | 705/37 |
| 6,347,307 | B1 | 2/2002 | Sandhu et al. | 705/35 |
| 6,421,653 | B1 | 7/2002 | May | 705/37 |

FOREIGN PATENT DOCUMENTS

| | | |
|---|---|---|
| EP | 0 407 026 B1 | 11/1995 |
| EP | 0 873 549 B1 | 10/1998 |
| HU | 60869 | 10/1992 |
| JP | 4-195297 | 7/1992 |
| JP | 9-7069 | 1/1997 |
| WO | WO 94/10637 | 5/1994 |
| WO | WO 96/34357 | 10/1996 |
| WO | WO 98/59455 | 12/1998 |
| WO | WO 00/03342 | 1/2000 |
| WO | WO 00/21013 | 4/2000 |
| WO | WO 00/39719 | 7/2000 |
| WO | WO 00/48109 | 8/2000 |

OTHER PUBLICATIONS

Richard Goodwin et al., “Intelligent Decision Support for the e-Supply for the e-Supply Chain”, American Association for Artificial Intelligence, 1999 (printed Dec. 2, 2005 at http://www.research.ibm.com/CoopDS/aiec99.PDF).

* cited by examiner

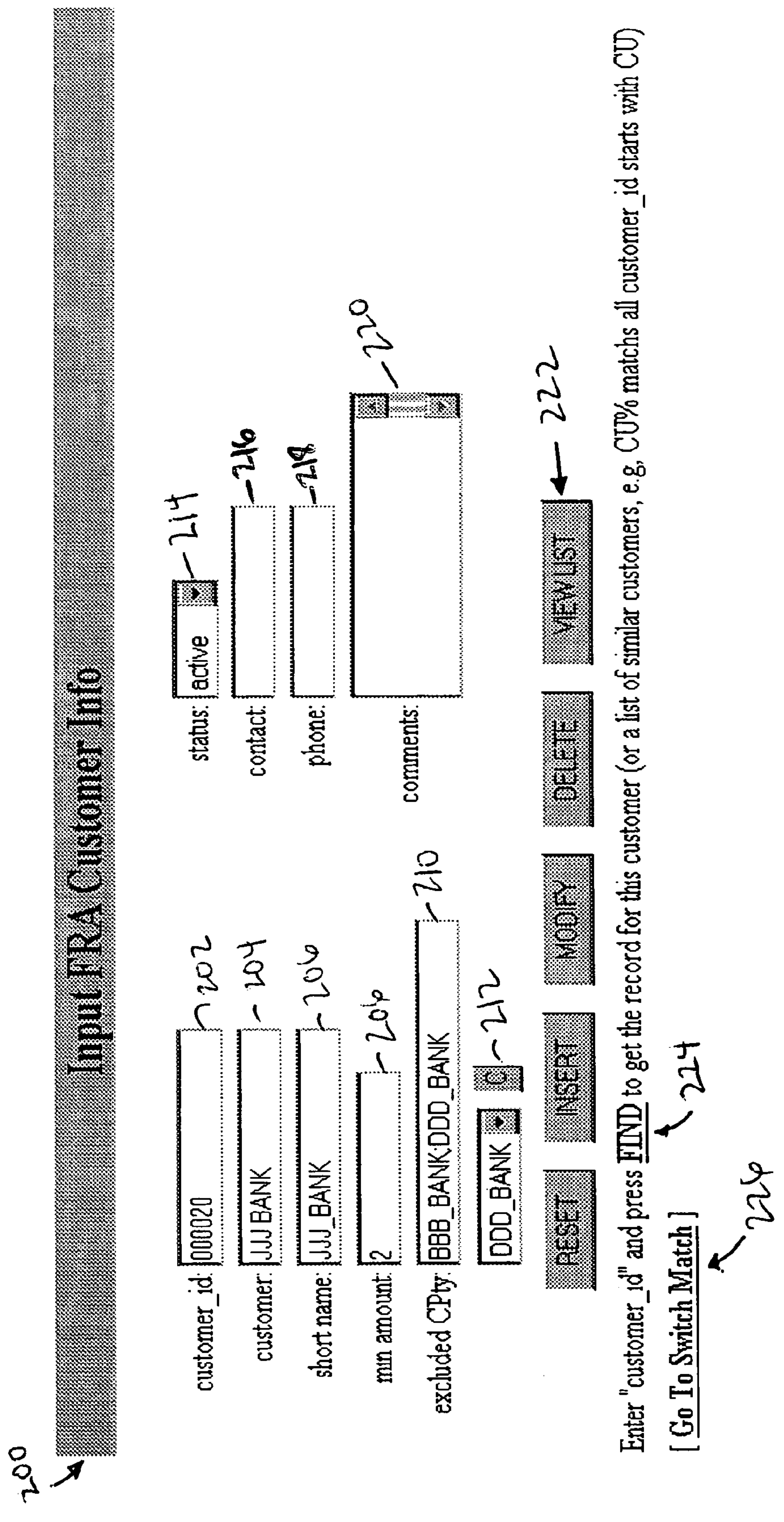

FIG. 2

Input FRA Customer Info

- customer_id: 000020 ~202
- customer: JJJ BANK ~204
- short name: JJJ_BANK ~206
- min amount: 2 ~208
- excluded CPty: BBB_BANK;DDD_BANK ~210
- DDD_BANK ▼ C ~212

- status: active ▼ ~214
- contact: ~216
- phone: ~218
- comments: ~220

RESET  INSERT  MODIFY  DELETE  VIEW LIST ~222

Enter "customer_id" and press <u>FIND</u> to get the record for this customer (or a list of similar customers, e.g., CU% matchs all customer_id starts with CU) ~224

[ Go To Switch Match ] ~226

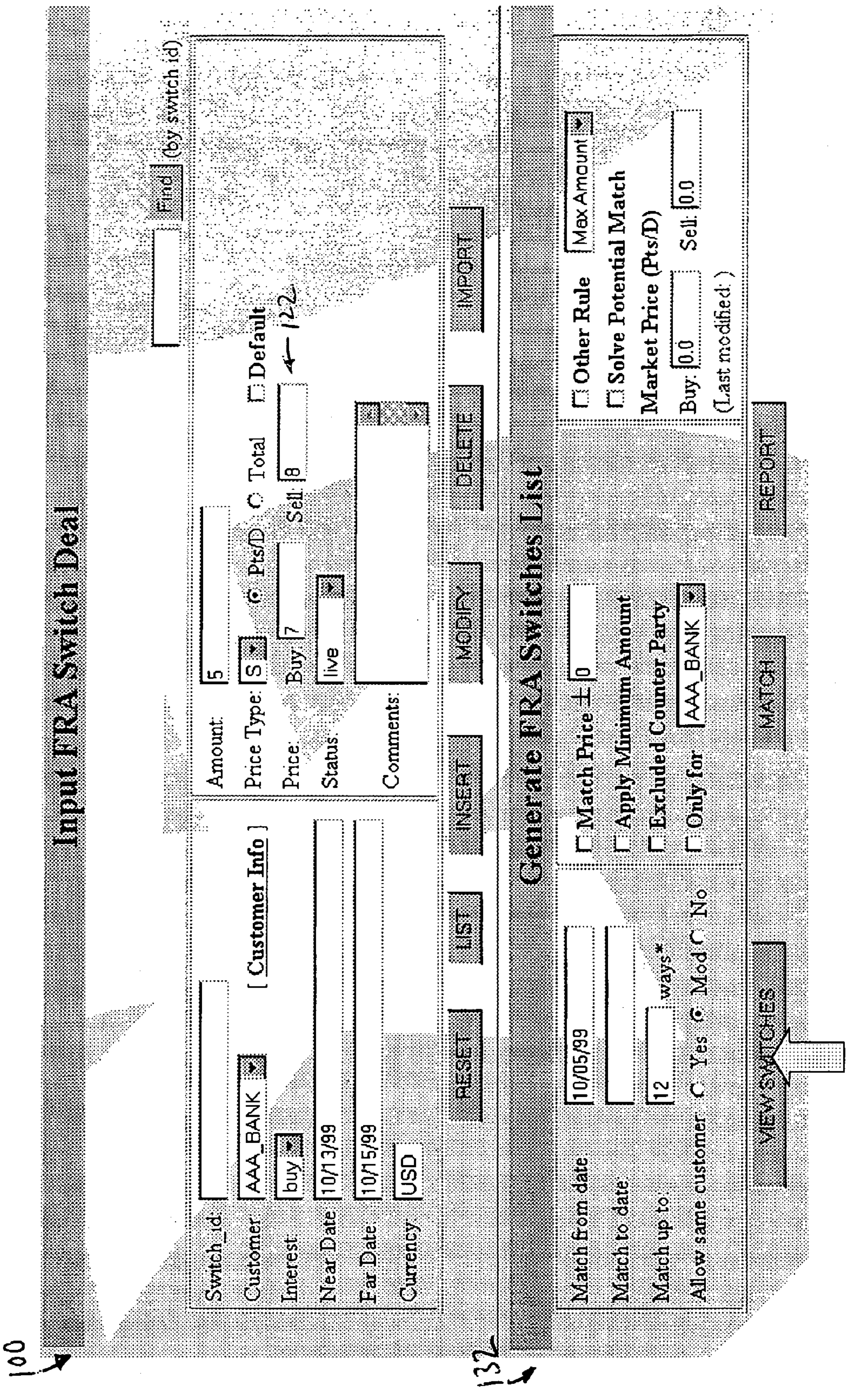

FIG. 3

Input FRA Switch Deal

Switch_id: [____]
Customer: [AAA_BANK ▼]   [Customer Info]
Interest: [buy ▼]
Near Date: [10/13/99]
Far Date: [10/15/99]
Currency: [USD]

Amount: [5]
Price Type: [S ▼]  ⦿ Pts/D  ○ Total   ☐ Default
Price: Buy: [7]   Sell: [8]  ← 122
Status: [live ▼]
Comments: [____]

[RESET] [LIST] [INSERT] [MODIFY] [DELETE] [IMPORT]

[Find] (by switch id)

Generate FRA Switches List

Match from date: [10/05/99]
Match to date: [_____]
Match up to: [12] ____ways*
Allow same customer ○ Yes ⦿ Mod ○ No ☐ Match Price ± [0]
☐ Apply Minimum Amount
☐ Excluded Counter Party
☐ Only for [AAA_BANK ▼]

☐ Other Rule  [Max Amount ▼]
☐ Solve Potential Match
Market Price (Pts/D)
Buy: [0.0]   Sell: [0.0]
(Last modified: )

[VIEW SWITCHES] [MATCH] [REPORT]

Figure 4:
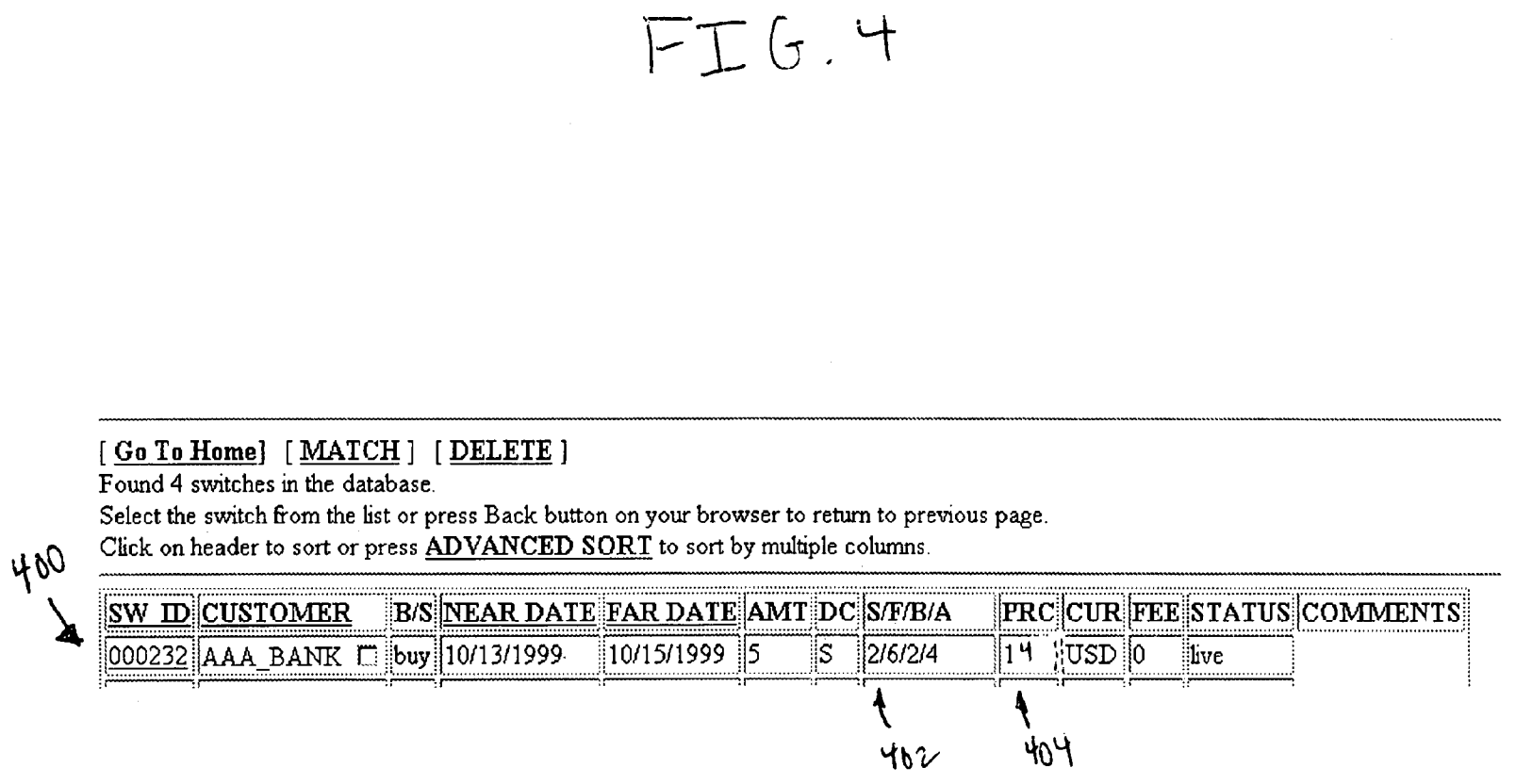

[ Go To Home ] [ MATCH ] [ DELETE ]
Found 4 switches in the database.
Select the switch from the list or press Back button on your browser to return to previous page.
Click on header to sort or press ADVANCED SORT to sort by multiple columns.

400

| SW ID | CUSTOMER | B/S | NEAR DATE | FAR DATE | AMT | DC | S/F/B/A | PRC | CUR | FEE | STATUS | COMMENTS |
|---|---|---|---|---|---|---|---|---|---|---|---|---|
| 000232 | AAA_BANK ☐ | buy | 10/13/1999 | 10/15/1999 | 5 | S | 2/6/2/4 | 14 | USD | 0 | live | |

402 404

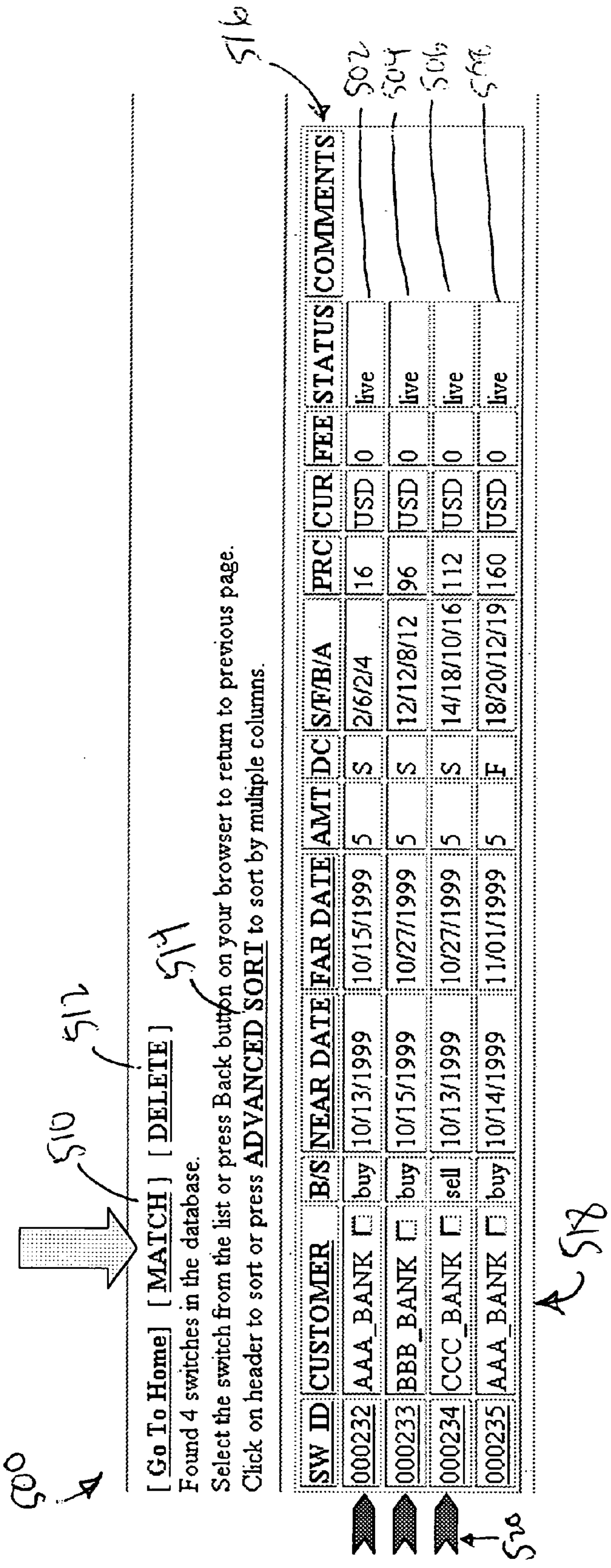

FIG. 5

[ Go To Home ] [ MATCH ] [ DELETE ]
Found 4 switches in the database.
Select the switch from the list or press Back button on your browser to return to previous page.
Click on header to sort or press ADVANCED SORT to sort by multiple columns.

| SW ID | CUSTOMER | B/S | NEAR DATE | FAR DATE | AMT | DC | S/F/B/A | PRC | CUR | FEE | STATUS | COMMENTS |
|---|---|---|---|---|---|---|---|---|---|---|---|---|
| 000232 | AAA_BANK ☐ | buy | 10/13/1999 | 10/15/1999 | 5 | S | 2/6/2/4 | 16 | USD | 0 | live | |
| 000233 | BBB_BANK ☐ | buy | 10/15/1999 | 10/27/1999 | 5 | S | 12/12/8/12 | 96 | USD | 0 | live | |
| 000234 | CCC_BANK ☐ | sell | 10/13/1999 | 10/27/1999 | 5 | S | 14/18/10/16 | 112 | USD | 0 | live | |
| 000235 | AAA_BANK ☐ | buy | 10/14/1999 | 11/01/1999 | 5 | F | 18/20/12/19 | 160 | USD | 0 | live | |

FIG. 6

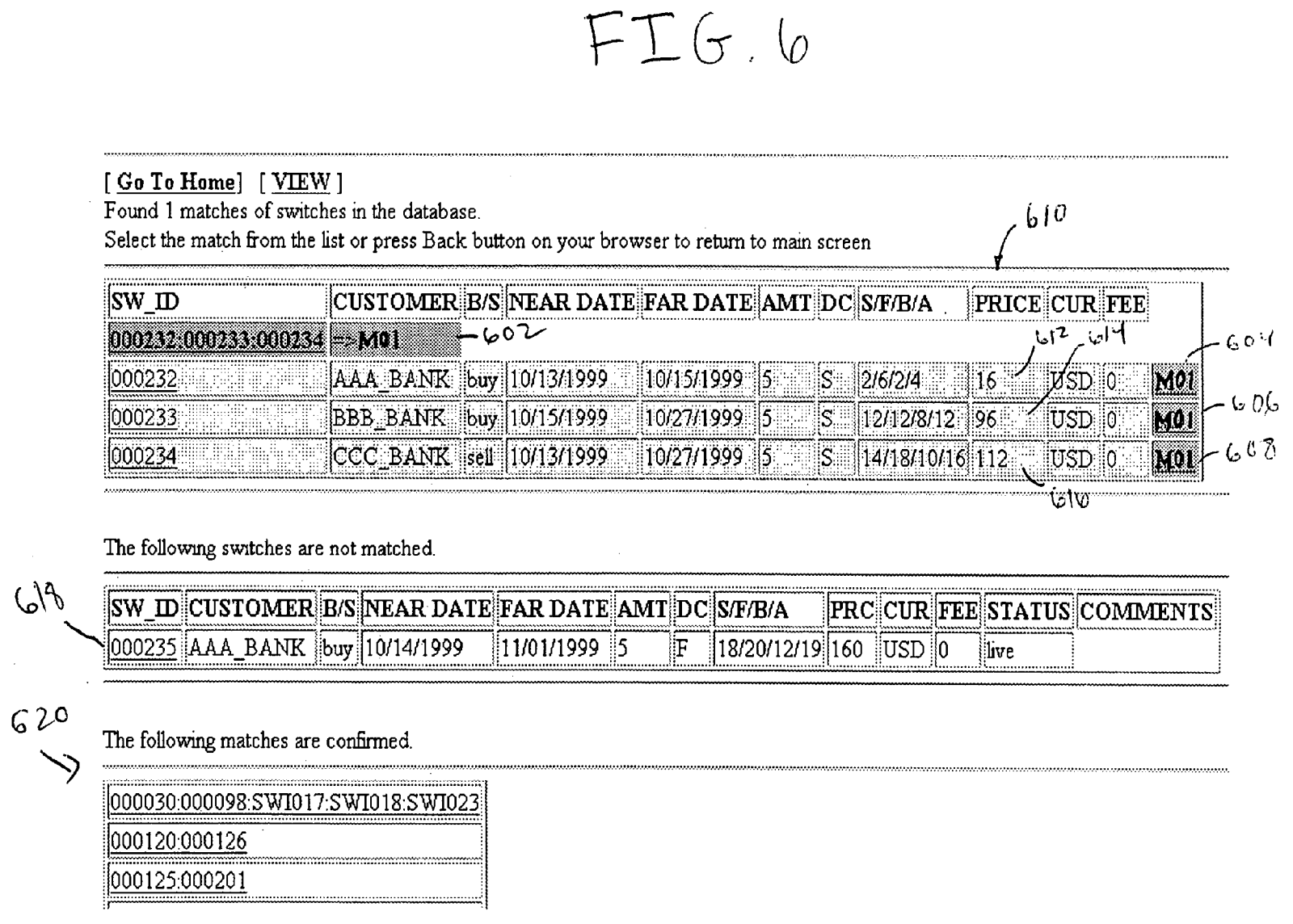

[ Go To Home] [ VIEW ]
Found 1 matches of switches in the database.
Select the match from the list or press Back button on your browser to return to main screen

| SW_ID | CUSTOMER | B/S | NEAR DATE | FAR DATE | AMT | DC | S/F/B/A | PRICE | CUR | FEE | |
|---|---|---|---|---|---|---|---|---|---|---|---|
| 000232:000233:000234 | =>M01 | | | | | | | | | | |
| 000232 | AAA_BANK | buy | 10/13/1999 | 10/15/1999 | 5 | S | 2/6/2/4 | 16 | USD | 0 | M01 |
| 000233 | BBB_BANK | buy | 10/15/1999 | 10/27/1999 | 5 | S | 12/12/8/12 | 96 | USD | 0 | M01 |
| 000234 | CCC_BANK | sell | 10/13/1999 | 10/27/1999 | 5 | S | 14/18/10/16 | 112 | USD | 0 | M01 |

The following switches are not matched.

| SW_ID | CUSTOMER | B/S | NEAR DATE | FAR DATE | AMT | DC | S/F/B/A | PRC | CUR | FEE | STATUS | COMMENTS |
|---|---|---|---|---|---|---|---|---|---|---|---|---|
| 000235 | AAA_BANK | buy | 10/14/1999 | 11/01/1999 | 5 | F | 18/20/12/19 | 160 | USD | 0 | live | |

The following matches are confirmed.

| |
|---|
| 000030:000098:SWI017:SWI018:SWI023 |
| 000120:000126 |
| 000125:000201 |

FIG. 7

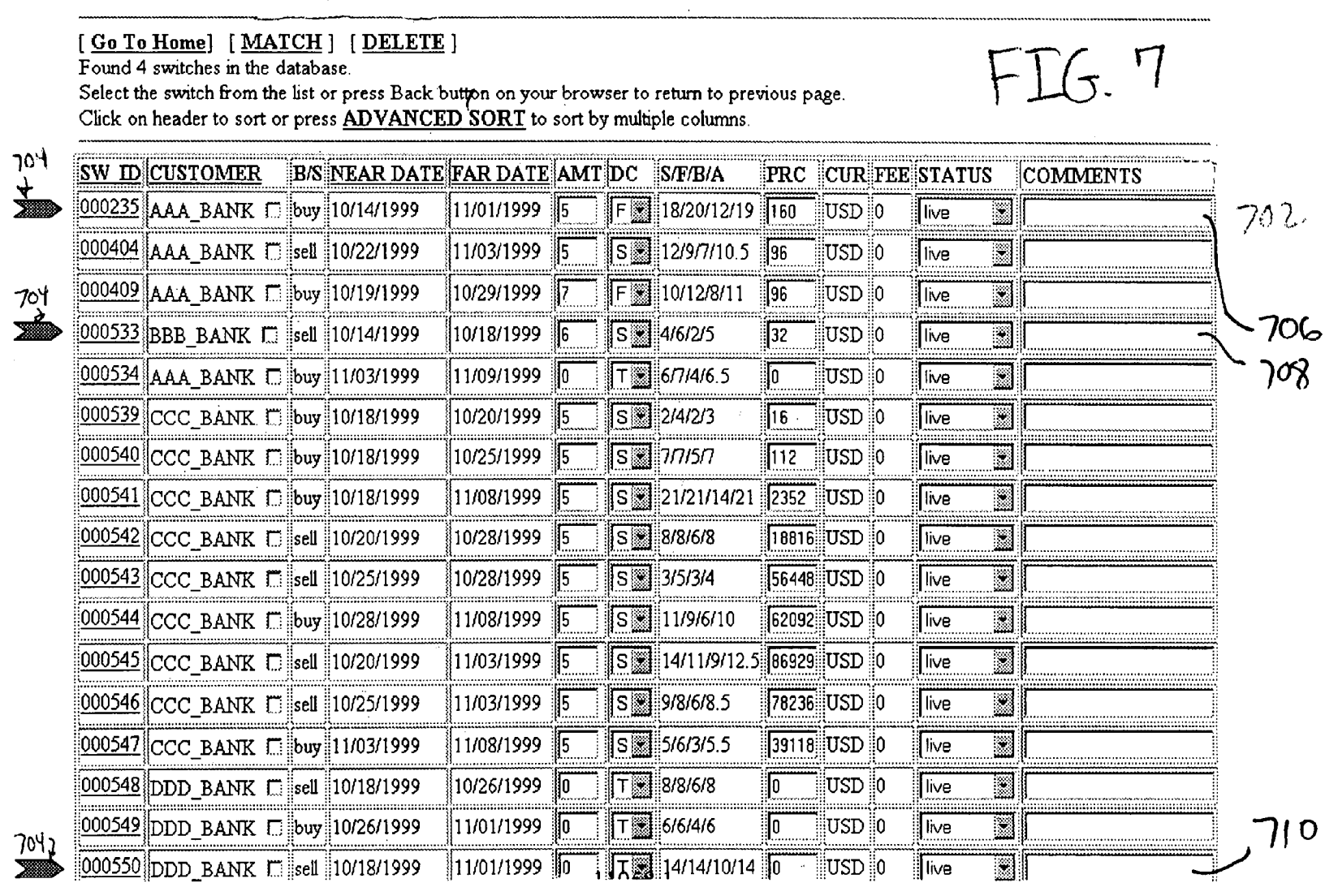

[ Go To Home] [ MATCH ] [ DELETE ]
Found 4 switches in the database.
Select the switch from the list or press Back button on your browser to return to previous page.
Click on header to sort or press ADVANCED SORT to sort by multiple columns.

| SW ID | CUSTOMER | B/S | NEAR DATE | FAR DATE | AMT | DC | S/F/B/A | PRC | CUR | FEE | STATUS | COMMENTS |
|---|---|---|---|---|---|---|---|---|---|---|---|---|
| 000235 | AAA_BANK | buy | 10/14/1999 | 11/01/1999 | 5 | F | 18/20/12/19 | 160 | USD | 0 | live | |
| 000404 | AAA_BANK | sell | 10/22/1999 | 11/03/1999 | 5 | S | 12/9/7/10.5 | 96 | USD | 0 | live | |
| 000409 | AAA_BANK | buy | 10/19/1999 | 10/29/1999 | 7 | F | 10/12/8/11 | 96 | USD | 0 | live | |
| 000533 | BBB_BANK | sell | 10/14/1999 | 10/18/1999 | 6 | S | 4/6/2/5 | 32 | USD | 0 | live | |
| 000534 | AAA_BANK | buy | 11/03/1999 | 11/09/1999 | 0 | T | 6/7/4/6.5 | 0 | USD | 0 | live | |
| 000539 | CCC_BANK | buy | 10/18/1999 | 10/20/1999 | 5 | S | 2/4/2/3 | 16 | USD | 0 | live | |
| 000540 | CCC_BANK | buy | 10/18/1999 | 10/25/1999 | 5 | S | 7/7/5/7 | 112 | USD | 0 | live | |
| 000541 | CCC_BANK | buy | 10/18/1999 | 11/08/1999 | 5 | S | 21/21/14/21 | 2352 | USD | 0 | live | |
| 000542 | CCC_BANK | sell | 10/20/1999 | 10/28/1999 | 5 | S | 8/8/6/8 | 18816 | USD | 0 | live | |
| 000543 | CCC_BANK | sell | 10/25/1999 | 10/28/1999 | 5 | S | 3/5/3/4 | 56448 | USD | 0 | live | |
| 000544 | CCC_BANK | buy | 10/28/1999 | 11/08/1999 | 5 | S | 11/9/6/10 | 62092 | USD | 0 | live | |
| 000545 | CCC_BANK | sell | 10/20/1999 | 11/03/1999 | 5 | S | 14/11/9/12.5 | 86929 | USD | 0 | live | |
| 000546 | CCC_BANK | sell | 10/25/1999 | 11/03/1999 | 5 | S | 9/8/6/8.5 | 78236 | USD | 0 | live | |
| 000547 | CCC_BANK | buy | 11/03/1999 | 11/08/1999 | 5 | S | 5/6/3/5.5 | 39118 | USD | 0 | live | |
| 000548 | DDD_BANK | sell | 10/18/1999 | 10/26/1999 | 0 | T | 8/8/6/8 | 0 | USD | 0 | live | |
| 000549 | DDD_BANK | buy | 10/26/1999 | 11/01/1999 | 0 | T | 6/6/4/6 | 0 | USD | 0 | live | |
| 000550 | DDD_BANK | sell | 10/18/1999 | 11/01/1999 | 0 | T | 14/14/10/14 | 0 | USD | 0 | live | |

Figure 8:
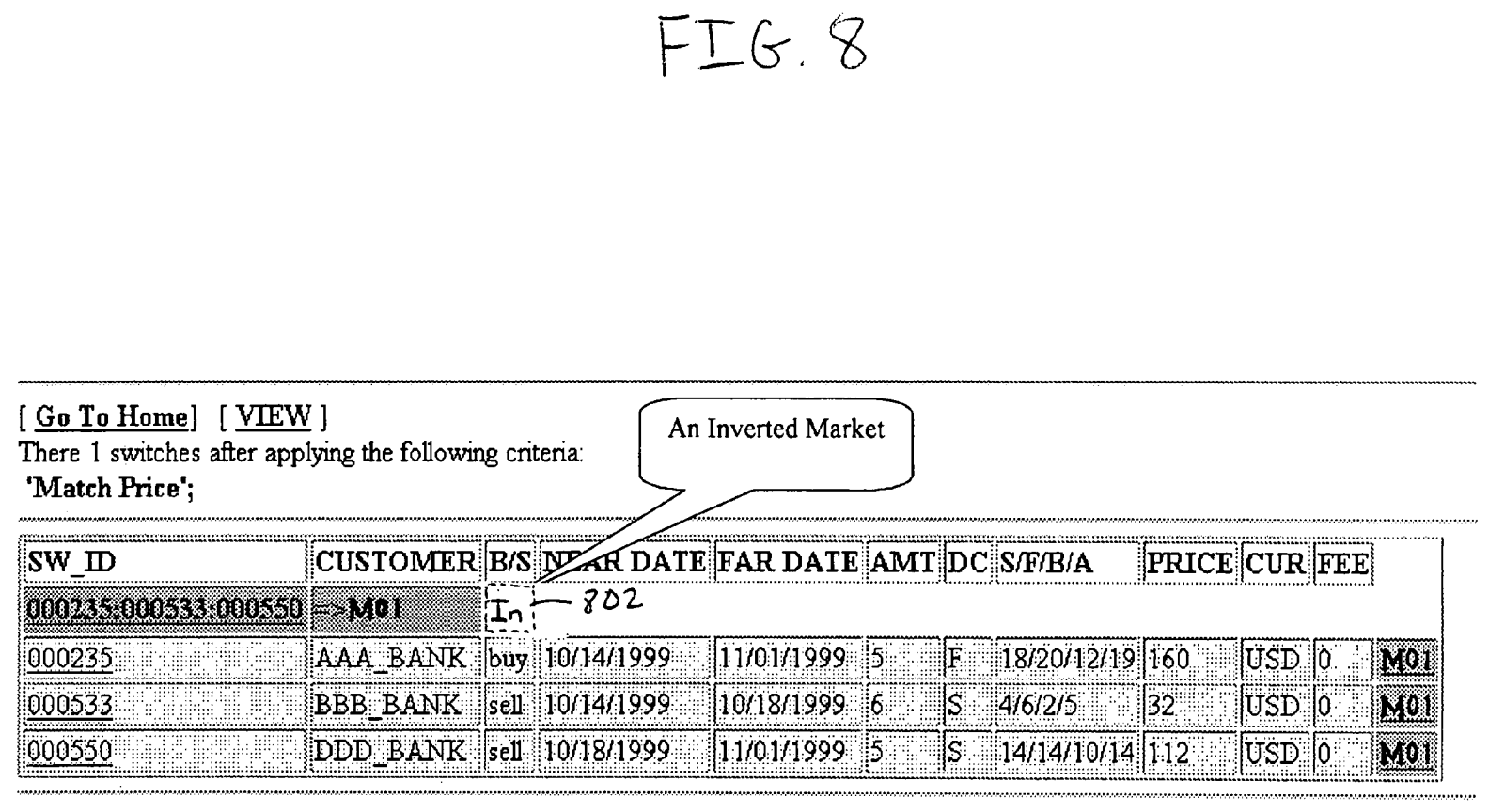

[ Go To Home ] [ VIEW ]
There 1 switches after applying the following criteria:
'Match Price';

An Inverted Market

802

| SW_ID | CUSTOMER | B/S | NEAR DATE | FAR DATE | AMT | DC | S/F/B/A | PRICE | CUR | FEE | |
|---|---|---|---|---|---|---|---|---|---|---|---|
| 000235:000533:000550 | =>M01 | In | | | | | | | | | |
| 000235 | AAA_BANK | buy | 10/14/1999 | 11/01/1999 | 5 | F | 18/20/12/19 | 160 | USD | 0 | M01 |
| 000533 | BBB_BANK | sell | 10/14/1999 | 10/18/1999 | 6 | S | 4/6/2/5 | 32 | USD | 0 | M01 |
| 000550 | DDD_BANK | sell | 10/18/1999 | 11/01/1999 | 5 | S | 14/14/10/14 | 112 | USD | 0 | M01 |

Figure 10:
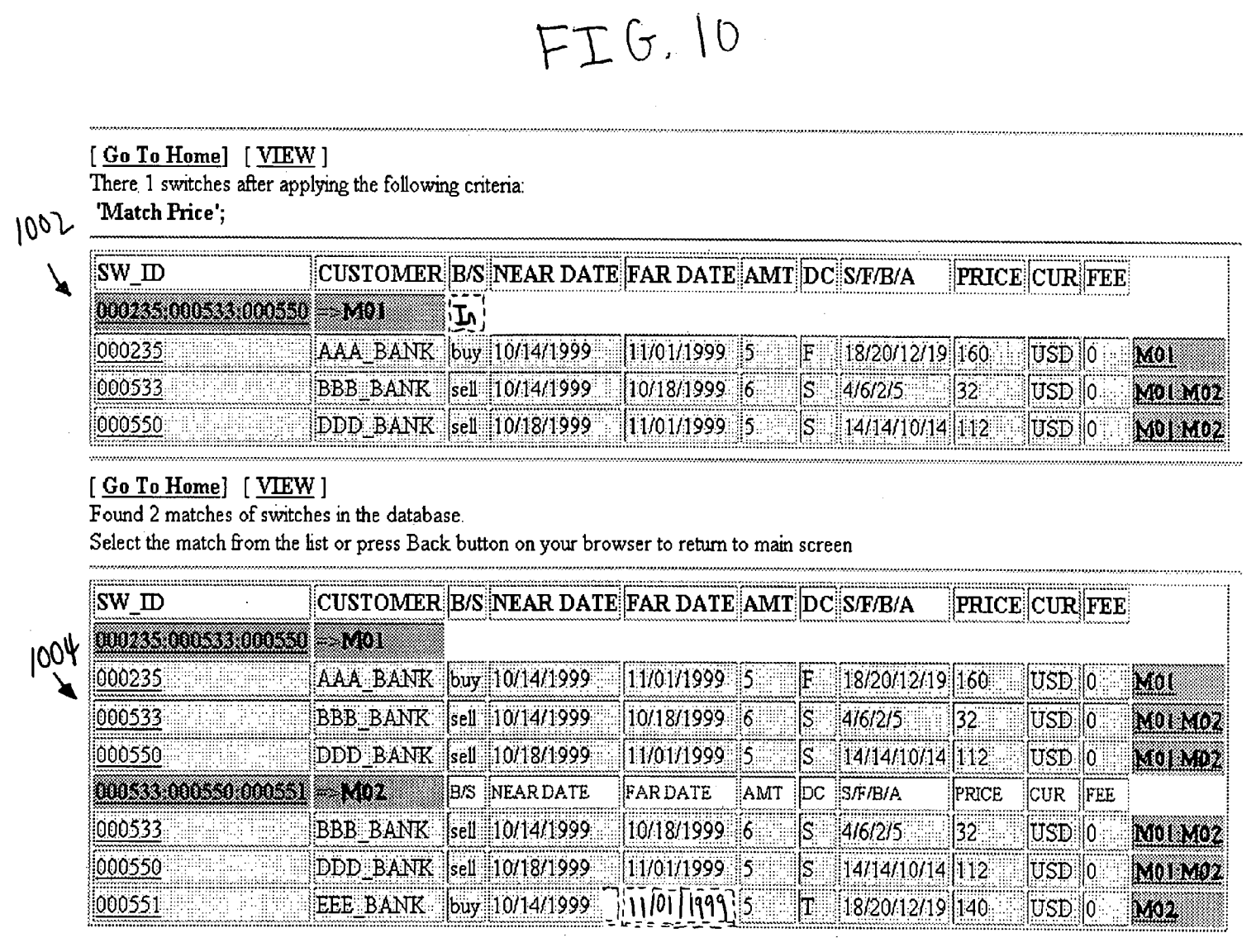

[ Go To Home ] [ VIEW ]
There 1 switches after applying the following criteria:
'Match Price';

| SW_ID | CUSTOMER | B/S | NEAR DATE | FAR DATE | AMT | DC | S/F/B/A | PRICE | CUR | FEE | |
|---|---|---|---|---|---|---|---|---|---|---|---|
| 000235:000533:000550 | -->M01 | | | | | | | | | | |
| 000235 | AAA_BANK | buy | 10/14/1999 | 11/01/1999 | 5 | F | 18/20/12/19 | 160 | USD | 0 | M01 |
| 000533 | BBB_BANK | sell | 10/14/1999 | 10/18/1999 | 6 | S | 4/6/2/5 | 32 | USD | 0 | M01 M02 |
| 000550 | DDD_BANK | sell | 10/18/1999 | 11/01/1999 | 5 | S | 14/14/10/14 | 112 | USD | 0 | M01 M02 |

1004

[ Go To Home ] [ VIEW ]
Found 2 matches of switches in the database.
Select the match from the list or press Back button on your browser to return to main screen

| SW_ID | CUSTOMER | B/S | NEAR DATE | FAR DATE | AMT | DC | S/F/B/A | PRICE | CUR | FEE | |
|---|---|---|---|---|---|---|---|---|---|---|---|
| 000235:000533:000550 | -->M01 | | | | | | | | | | |
| 000235 | AAA_BANK | buy | 10/14/1999 | 11/01/1999 | 5 | F | 18/20/12/19 | 160 | USD | 0 | M01 |
| 000533 | BBB_BANK | sell | 10/14/1999 | 10/18/1999 | 6 | S | 4/6/2/5 | 32 | USD | 0 | M01 M02 |
| 000550 | DDD_BANK | sell | 10/18/1999 | 11/01/1999 | 5 | S | 14/14/10/14 | 112 | USD | 0 | M01 M02 |
| 000533:000550:000551 | -->M02 | B/S | NEAR DATE | FAR DATE | AMT | DC | S/F/B/A | PRICE | CUR | FEE | |
| 000533 | BBB_BANK | sell | 10/14/1999 | 10/18/1999 | 6 | S | 4/6/2/5 | 32 | USD | 0 | M01 M02 |
| 000550 | DDD_BANK | sell | 10/18/1999 | 11/01/1999 | 5 | S | 14/14/10/14 | 112 | USD | 0 | M01 M02 |
| 000551 | EEE_BANK | buy | 10/14/1999 | 11/01/1999 | 5 | T | 18/20/12/19 | 140 | USD | 0 | M02 |

FIG. 11

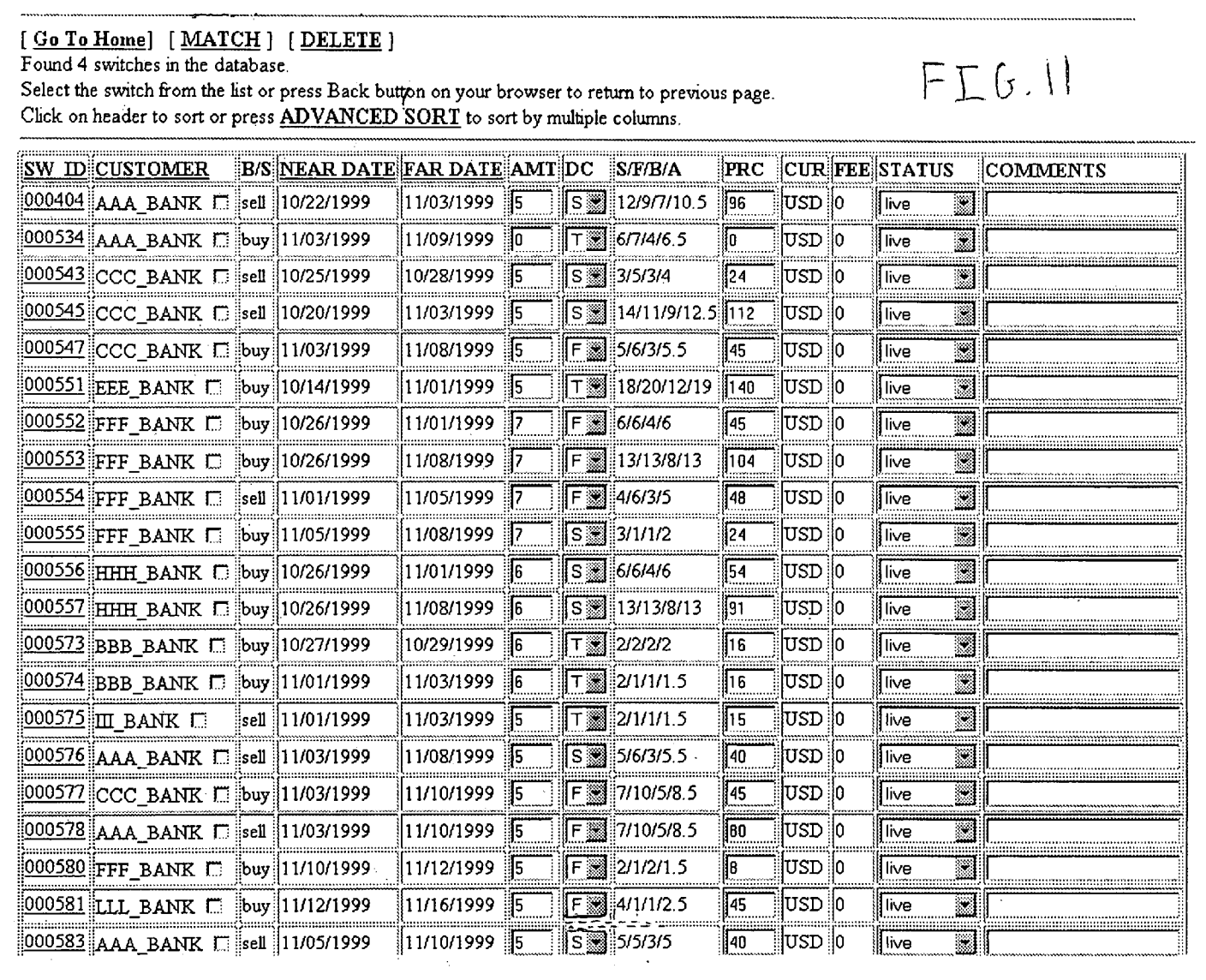

[ Go To Home] [ MATCH ] [ DELETE ]
Found 4 switches in the database.
Select the switch from the list or press Back button on your browser to return to previous page.
Click on header to sort or press ADVANCED SORT to sort by multiple columns.

| SW_ID | CUSTOMER | B/S | NEAR DATE | FAR DATE | AMT | DC | S/F/B/A | PRC | CUR | FEE | STATUS | COMMENTS |
|---|---|---|---|---|---|---|---|---|---|---|---|---|
| 000404 | AAA_BANK ☐ | sell | 10/22/1999 | 11/03/1999 | 5 | S | 12/9/7/10.5 | 96 | USD | 0 | live | |
| 000534 | AAA_BANK ☐ | buy | 11/03/1999 | 11/09/1999 | 0 | T | 6/7/4/6.5 | 0 | USD | 0 | live | |
| 000543 | CCC_BANK ☐ | sell | 10/25/1999 | 10/28/1999 | 5 | S | 3/5/3/4 | 24 | USD | 0 | live | |
| 000545 | CCC_BANK ☐ | sell | 10/20/1999 | 11/03/1999 | 5 | S | 14/11/9/12.5 | 112 | USD | 0 | live | |
| 000547 | CCC_BANK ☐ | buy | 11/03/1999 | 11/08/1999 | 5 | F | 5/6/3/5.5 | 45 | USD | 0 | live | |
| 000551 | EEE_BANK ☐ | buy | 10/14/1999 | 11/01/1999 | 5 | T | 18/20/12/19 | 140 | USD | 0 | live | |
| 000552 | FFF_BANK ☐ | buy | 10/26/1999 | 11/01/1999 | 7 | F | 6/6/4/6 | 45 | USD | 0 | live | |
| 000553 | FFF_BANK ☐ | buy | 10/26/1999 | 11/08/1999 | 7 | F | 13/13/8/13 | 104 | USD | 0 | live | |
| 000554 | FFF_BANK ☐ | sell | 11/01/1999 | 11/05/1999 | 7 | F | 4/6/3/5 | 48 | USD | 0 | live | |
| 000555 | FFF_BANK ☐ | buy | 11/05/1999 | 11/08/1999 | 7 | S | 3/1/1/2 | 24 | USD | 0 | live | |
| 000556 | HHH_BANK ☐ | buy | 10/26/1999 | 11/01/1999 | 6 | S | 6/6/4/6 | 54 | USD | 0 | live | |
| 000557 | HHH_BANK ☐ | buy | 10/26/1999 | 11/08/1999 | 6 | S | 13/13/8/13 | 91 | USD | 0 | live | |
| 000573 | BBB_BANK ☐ | buy | 10/27/1999 | 10/29/1999 | 6 | T | 2/2/2/2 | 16 | USD | 0 | live | |
| 000574 | BBB_BANK ☐ | buy | 11/01/1999 | 11/03/1999 | 6 | T | 2/1/1/1.5 | 16 | USD | 0 | live | |
| 000575 | III_BANK ☐ | sell | 11/01/1999 | 11/03/1999 | 5 | T | 2/1/1/1.5 | 15 | USD | 0 | live | |
| 000576 | AAA_BANK ☐ | sell | 11/03/1999 | 11/08/1999 | 5 | S | 5/6/3/5.5 | 40 | USD | 0 | live | |
| 000577 | CCC_BANK ☐ | buy | 11/03/1999 | 11/10/1999 | 5 | F | 7/10/5/8.5 | 45 | USD | 0 | live | |
| 000578 | AAA_BANK ☐ | sell | 11/03/1999 | 11/10/1999 | 5 | F | 7/10/5/8.5 | 80 | USD | 0 | live | |
| 000580 | FFF_BANK ☐ | buy | 11/10/1999 | 11/12/1999 | 5 | F | 2/1/2/1.5 | 8 | USD | 0 | live | |
| 000581 | LLL_BANK ☐ | buy | 11/12/1999 | 11/16/1999 | 5 | F | 4/1/1/2.5 | 45 | USD | 0 | live | |
| 000583 | AAA_BANK ☐ | sell | 11/05/1999 | 11/10/1999 | 5 | S | 5/5/3/5 | 40 | USD | 0 | live | |

FIG. 12

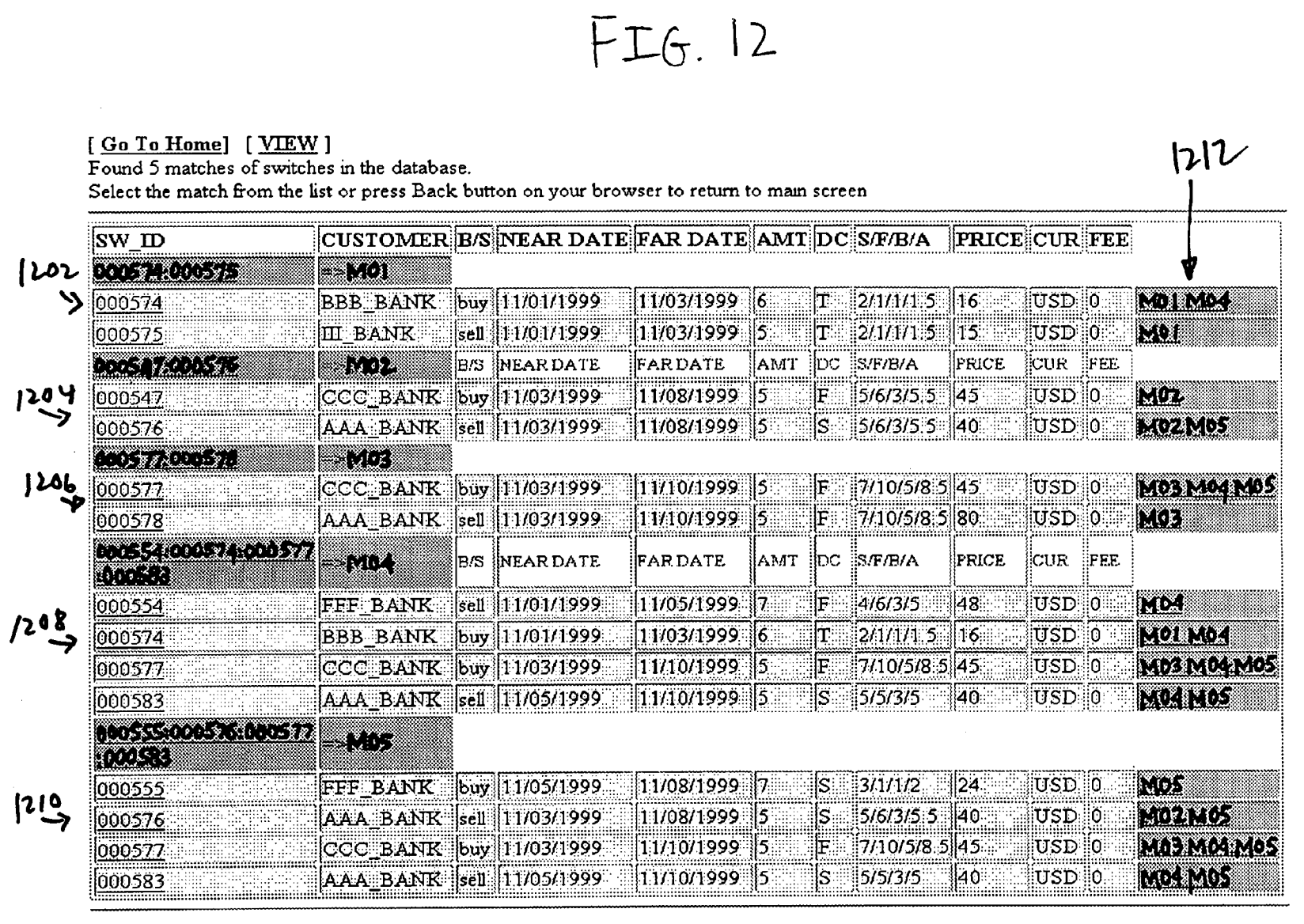

[ Go To Home] [ VIEW ]
Found 5 matches of switches in the database.
Select the match from the list or press Back button on your browser to return to main screen

| | SW_ID | CUSTOMER | B/S | NEAR DATE | FAR DATE | AMT | DC | S/F/B/A | PRICE | CUR | FEE | 1212 |
|---|---|---|---|---|---|---|---|---|---|---|---|---|
| 1202 | 000574:000575 | ==M01 | | | | | | | | | | |
| | 000574 | BBB_BANK | buy | 11/01/1999 | 11/03/1999 | 6 | T | 2/1/1/1.5 | 16 | USD | 0 | M01 M04 |
| | 000575 | III_BANK | sell | 11/01/1999 | 11/03/1999 | 5 | T | 2/1/1/1.5 | 15 | USD | 0 | M01 |
| | 000547:000576 | ==M02 | B/S | NEAR DATE | FAR DATE | AMT | DC | S/F/B/A | PRICE | CUR | FEE | |
| 1204 | 000547 | CCC_BANK | buy | 11/03/1999 | 11/08/1999 | 5 | F | 5/6/3/5.5 | 45 | USD | 0 | M02 |
| | 000576 | AAA_BANK | sell | 11/03/1999 | 11/08/1999 | 5 | S | 5/6/3/5.5 | 40 | USD | 0 | M02 M05 |
| | 000577:000578 | ==M03 | | | | | | | | | | |
| 1206 | 000577 | CCC_BANK | buy | 11/03/1999 | 11/10/1999 | 5 | F | 7/10/5/8.5 | 45 | USD | 0 | M03 M04 M05 |
| | 000578 | AAA_BANK | sell | 11/03/1999 | 11/10/1999 | 5 | F | 7/10/5/8.5 | 80 | USD | 0 | M03 |
| | 000554:000574:000577:000583 | ==M04 | B/S | NEAR DATE | FAR DATE | AMT | DC | S/F/B/A | PRICE | CUR | FEE | |
| | 000554 | FFF_BANK | sell | 11/01/1999 | 11/05/1999 | 7 | F | 4/6/3/5 | 48 | USD | 0 | M04 |
| 1208 | 000574 | BBB_BANK | buy | 11/01/1999 | 11/03/1999 | 6 | T | 2/1/1/1.5 | 16 | USD | 0 | M01 M04 |
| | 000577 | CCC_BANK | buy | 11/03/1999 | 11/10/1999 | 5 | F | 7/10/5/8.5 | 45 | USD | 0 | M03 M04 M05 |
| | 000583 | AAA_BANK | sell | 11/05/1999 | 11/10/1999 | 5 | S | 5/5/3/5 | 40 | USD | 0 | M04 M05 |
| | 000555:000576:000577:000583 | ==M05 | | | | | | | | | | |
| 1210 | 000555 | FFF_BANK | buy | 11/05/1999 | 11/08/1999 | 7 | S | 3/1/1/2 | 24 | USD | 0 | M05 |
| | 000576 | AAA_BANK | sell | 11/03/1999 | 11/08/1999 | 5 | S | 5/6/3/5.5 | 40 | USD | 0 | M02 M05 |
| | 000577 | CCC_BANK | buy | 11/03/1999 | 11/10/1999 | 5 | F | 7/10/5/8.5 | 45 | USD | 0 | M03 M04 M05 |
| | 000583 | AAA_BANK | sell | 11/05/1999 | 11/10/1999 | 5 | S | 5/5/3/5 | 40 | USD | 0 | M04 M05 |

[ Go To Home]  [ VIEW ]
There 1 switches after applying the following criteria:
'Sorted by Minimum Spread.'

| SW_ID | CUSTOMER | B/S | NEAR DATE | FAR DATE | AMT | DC | S/F/B/A | PRICE | CUR | FEE | |
|---|---|---|---|---|---|---|---|---|---|---|---|
| 000595 000597 | | buy | 10/28/1999 | 11/03/1999 | 10 | | | 0 | | | M01 |
| 000595 | HHH_BANK | buy | 10/28/1999 | 11/03/1999 | 10 | F | 6/3/3/4.5 | 24 | USD | 0 | M01 |
| 000596 | III_BANK | sell | 10/28/1999 | 11/01/1999 | 10 | F | 4/2/2/3 | 16 | USD | 0 | M01 |
| 000597 | LLL_BANK | sell | 11/01/1999 | 11/03/1999 | 10 | F | 2/1/1/1.5 | 8 | USD | 0 | M01 |

FIG. 14

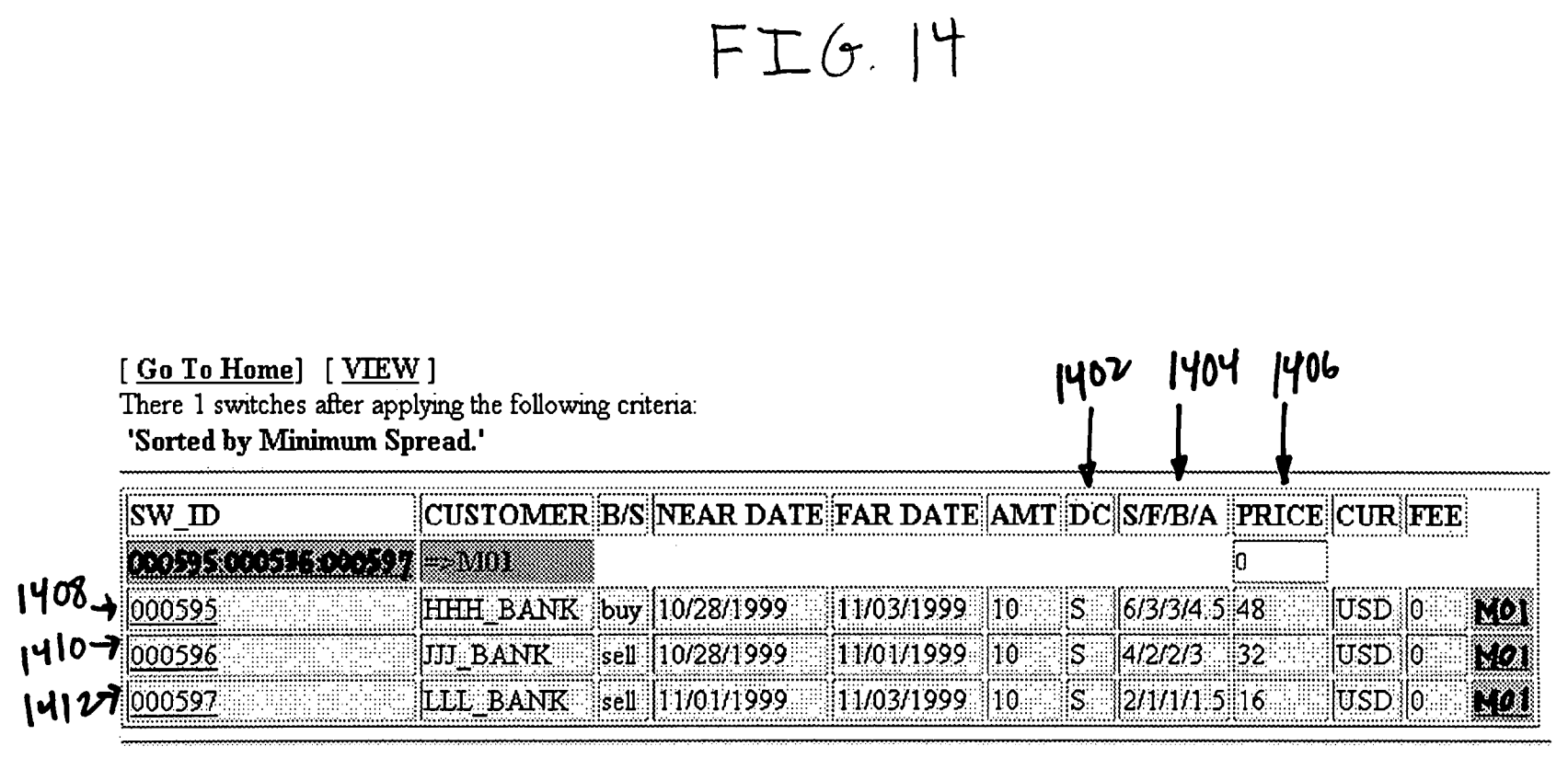

[ Go To Home] [ VIEW ]
There 1 switches after applying the following criteria:
'Sorted by Minimum Spread.'

1402 → DC; 1404 → S/F/B/A; 1406 → PRICE

| | SW_ID | CUSTOMER | B/S | NEAR DATE | FAR DATE | AMT | DC | S/F/B/A | PRICE | CUR | FEE | |
|---|---|---|---|---|---|---|---|---|---|---|---|---|
| | 000595.000596.000597 | =>M01 | | | | | | | 0 | | | |
| 1408 → | 000595 | HHH_BANK | buy | 10/28/1999 | 11/03/1999 | 10 | S | 6/3/3/4.5 | 48 | USD | 0 | M01 |
| 1410 → | 000596 | JJJ_BANK | sell | 10/28/1999 | 11/01/1999 | 10 | S | 4/2/2/3 | 32 | USD | 0 | M01 |
| 1412 → | 000597 | LLL_BANK | sell | 11/01/1999 | 11/03/1999 | 10 | S | 2/1/1/1.5 | 16 | USD | 0 | M01 |

FIG. 15

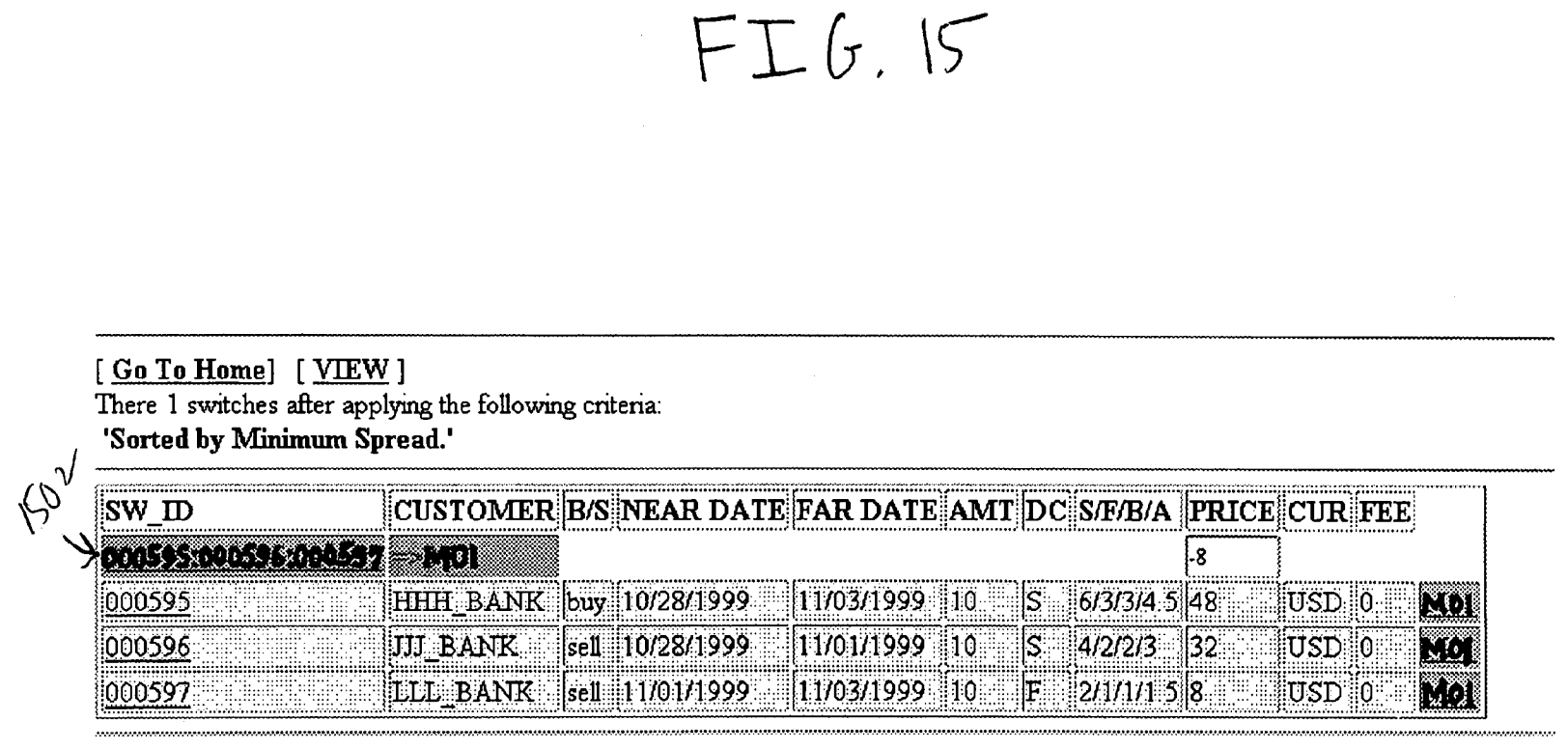

[ Go To Home ] [ VIEW ]

There 1 switches after applying the following criteria:

'Sorted by Minimum Spread.'

1502

| SW_ID | CUSTOMER | B/S | NEAR DATE | FAR DATE | AMT | DC | S/F/B/A | PRICE | CUR | FEE | |
|---|---|---|---|---|---|---|---|---|---|---|---|
| 000595:000596:000597 | —>M01 | | | | | | | -8 | | | |
| 000595 | HHH_BANK | buy | 10/28/1999 | 11/03/1999 | 10 | S | 6/3/3/4.5 | 48 | USD | 0 | M01 |
| 000596 | JJJ_BANK | sell | 10/28/1999 | 11/01/1999 | 10 | S | 4/2/2/3 | 32 | USD | 0 | M01 |
| 000597 | LLL_BANK | sell | 11/01/1999 | 11/03/1999 | 10 | F | 2/1/1/1.5 | 8 | USD | 0 | M01 |

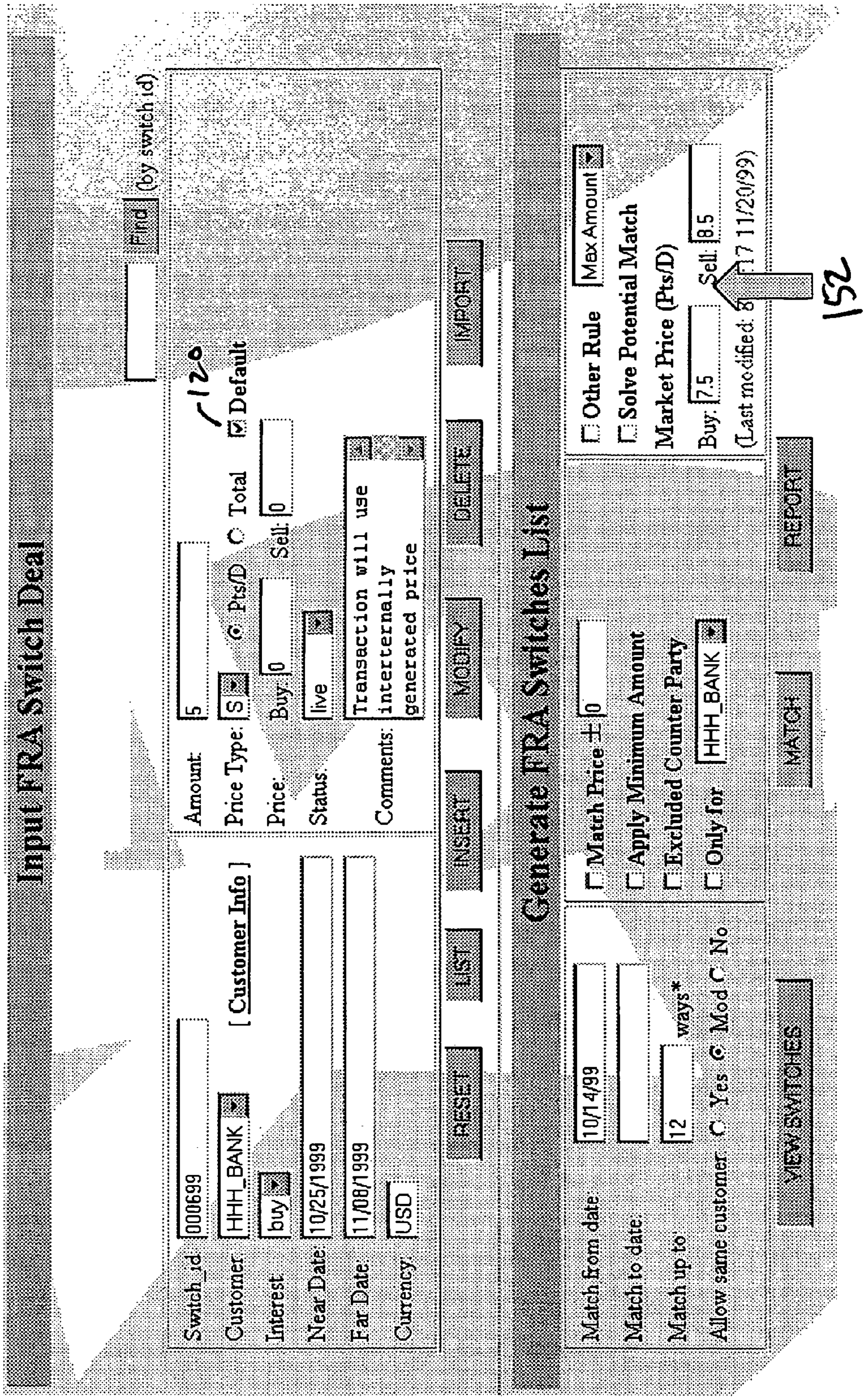

FIG. 16

Input FRA Switch Deal

Switch_id: 000699
Customer: HHH_BANK
Interest: buy
Near Date: 10/25/1999
Far Date: 11/08/1999
Currency: USD

[ Customer Info ]

Amount: 5
Price Type: S  ⦿ Pts/D  ○ Total   ☑ Default — 126
Price: Buy: 0  Sell: 0
Status: live
Comments: Transaction will use interternally generated price

RESET   LIST   INSERT   MODIFY   DELETE   IMPORT

Generate FRA Switches List

Match from date: 10/14/99
Match to date:
Match up to: 12 ways*
Allow same customer: ○ Yes ⦿ Mod ○ No ☐ Match Price ± 0
☐ Apply Minimum Amount
☐ Excluded Counter Party
☐ Only for HHH_BANK ☐ Other Rule   Max Amount
☐ Solve Potential Match
Market Price (Pts/D)
Buy: 7.5   Sell: 8.5
(Last modified: 8/17 11/20/99) ← 152

VIEW SWITCHES   MATCH   REPORT

Find (by switch id)

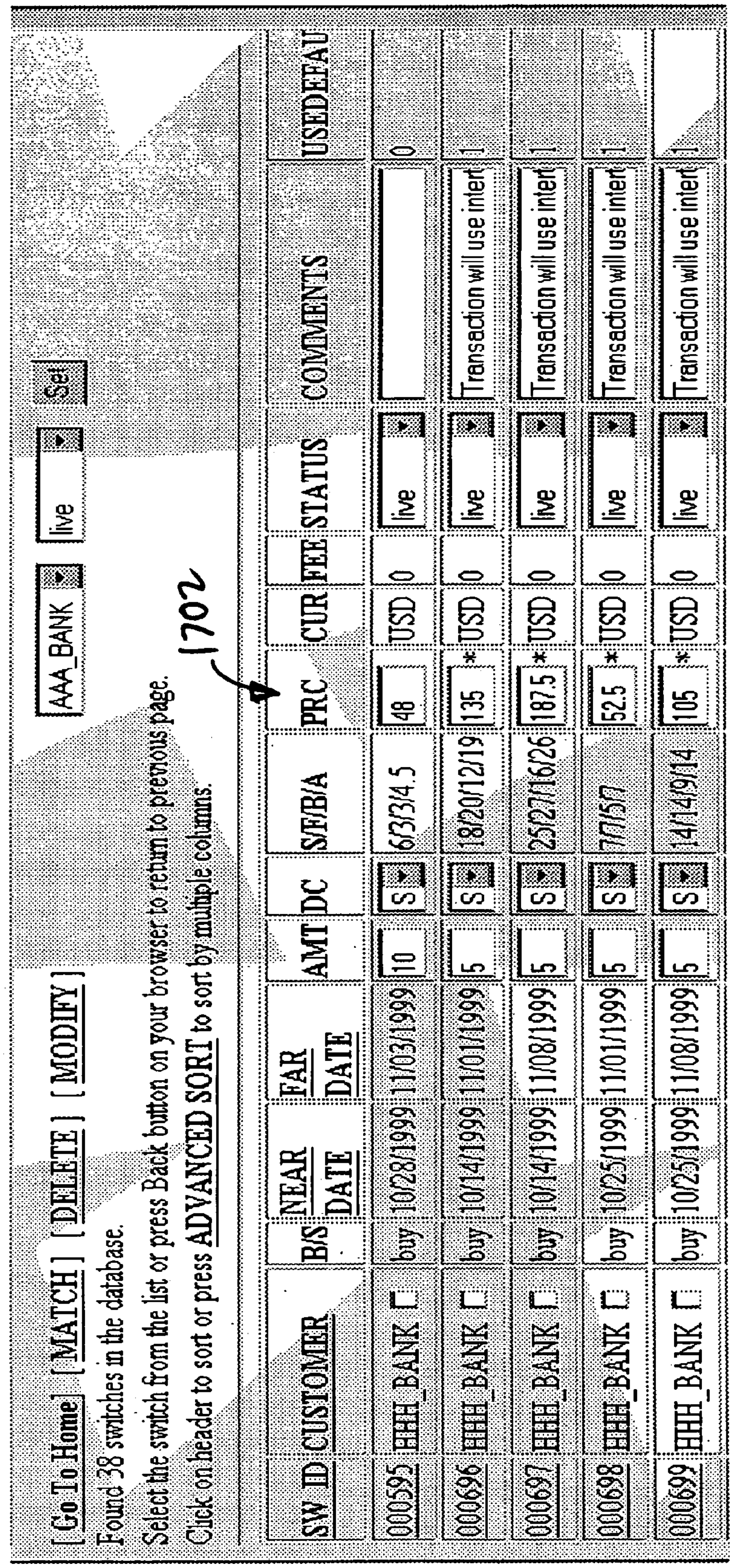

FIG. 17

[Go To Home] [MATCH] [DELETE] [MODIFY]

Found 38 switches in the database.

Select the switch from the list or press Back button on your browser to return to previous page.

Click on header to sort or press ADVANCED SORT to sort by multiple columns.

AAA_BANK ▼   live ▼   Set

| SW ID | CUSTOMER | B/S | NEAR DATE | FAR DATE | AMT | DC | S/F/B/A | PRC | CUR | FEE | STATUS | COMMENTS | USEDEFAU |
|---|---|---|---|---|---|---|---|---|---|---|---|---|---|
| 000595 | HHH_BANK ☐ | buy | 10/28/1999 | 11/03/1999 | 10 | S ▼ | 6/3/3/4.5 | 48 | USD | 0 | live ▼ |  | 0 |
| 000696 | HHH_BANK ☐ | buy | 10/14/1999 | 11/01/1999 | 5 | S ▼ | 18/20/12/19 | 135 * | USD | 0 | live ▼ | Transaction will use inter| | 1 |
| 000697 | HHH_BANK ☐ | buy | 10/14/1999 | 11/08/1999 | 5 | S ▼ | 25/27/16/26 | 187.5 * | USD | 0 | live ▼ | Transaction will use inter| | 1 |
| 000698 | HHH_BANK ☐ | buy | 10/25/1999 | 11/01/1999 | 5 | S ▼ | 7/7/5/7 | 52.5 * | USD | 0 | live ▼ | Transaction will use inter| | 1 |
| 000699 | HHH_BANK ☐ | buy | 10/25/1999 | 11/08/1999 | 5 | S ▼ | 14/14/9/14 | 105 * | USD | 0 | live ▼ | Transaction will use inter| | 1 |

1702 (arrow pointing to PRC column)

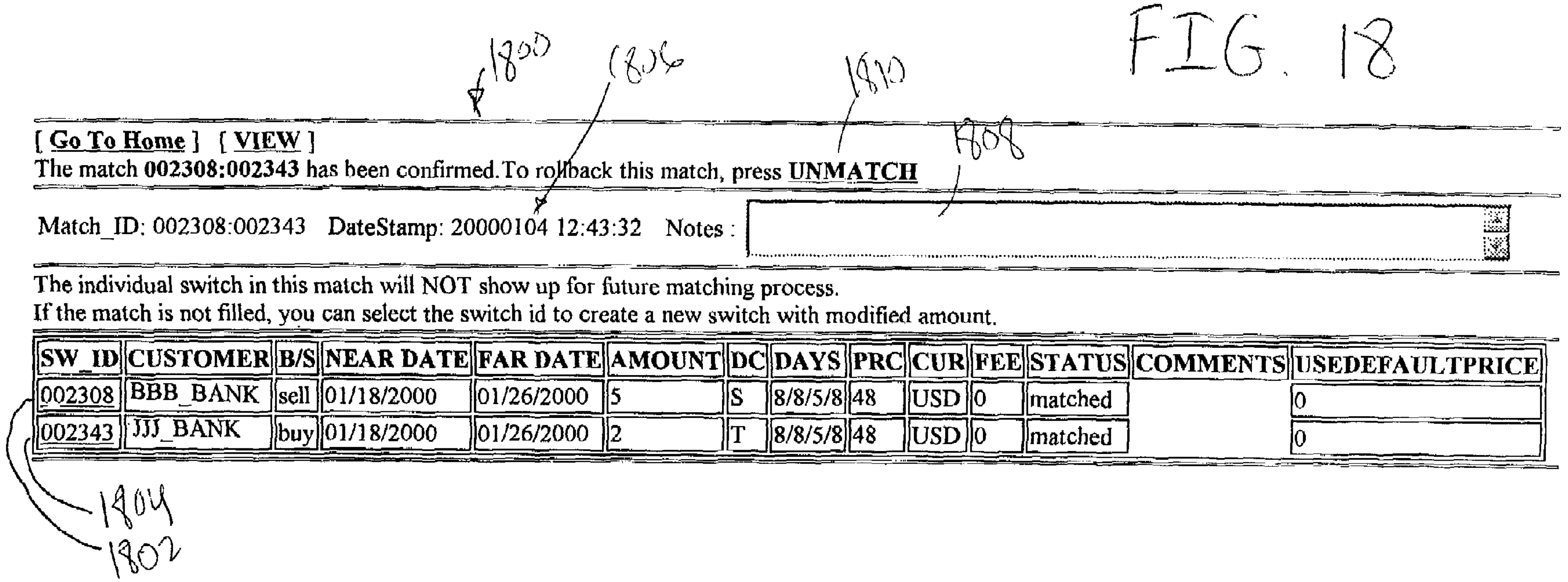

FIG. 18

[ Go To Home ] [ VIEW ]
The match 002308:002343 has been confirmed. To rollback this match, press UNMATCH Match_ID: 002308:002343  DateStamp: 20000104 12:43:32  Notes :

The individual switch in this match will NOT show up for future matching process.
If the match is not filled, you can select the switch id to create a new switch with modified amount.

| SW ID | CUSTOMER | B/S | NEAR DATE | FAR DATE | AMOUNT | DC | DAYS | PRC | CUR | FEE | STATUS | COMMENTS | USEDEFAULTPRICE |
|---|---|---|---|---|---|---|---|---|---|---|---|---|---|
| 002308 | BBB_BANK | sell | 01/18/2000 | 01/26/2000 | 5 | S | 8/8/5/8 | 48 | USD | 0 | matched | | 0 |
| 002343 | JJJ_BANK | buy | 01/18/2000 | 01/26/2000 | 2 | T | 8/8/5/8 | 48 | USD | 0 | matched | | 0 |

2100

| | | | Date/ Trait | | | | | | | | | | |
|---|---|---|---|---|---|---|---|---|---|---|---|---|---|
| | Switch | B/S | 1 | 2 | 3 | 4 | 5 | 6 | 7 | 8 | 9 | 10 | |
| 2101 | 1 | Buy | N | | | | | F | | | | | |
| 2102 | 2 | Buy | | | | | | N | | | F | | |
| 2103 | 3 | Sell | N | | | | | F | | | | | |
| 2104 | 4 | Sell | | | | | | N | | | F | | |
| 2105 | 5 | Buy | N | F | | | | | | | | | |
| 2106 | 6 | Buy | N | | | F | | | | | | | |
| 2107 | 7 | Buy | | | | | | | N | | | F | |
| 2108 | 8 | Sell | N | | | | | | | | | F | |
| 2110 | Propose | Sell | | | | N | | | F | | | | |

FIG. 21

SYSTEMS AND METHODS FOR MATCHING DESIRED PURCHASES AND SALES OF MIS-MATCHED ITEMS

CROSS REFERENCE TO RELATED APPLICATION

This application claims the benefit of U.S. Provisional Patent Application No. 60/176,200 filed Jan. 14, 2000.

BACKGROUND OF THE INVENTION

The present invention is systems and methods for matching desired purchases and sales of mis-matched items, such as goods, services, financial instruments, and property interests.

Frequently, it is desirable to purchase or sell items with particular traits that may not commonly be found in the open market. Examples of such items include financial instruments, such as Non-Deliverable Forward Spreads (NDFSs), Forward Rate Agreements (FRAs), and Treasury/Agency Bond Swaps, and property interests, such as time-share rights in vacation properties and airplanes. An NDFS is a contract to buy one currency on a near date and sell another at a predetermined forward time on a far date, where the contract is settled at the maturity time by means of a cash settlement in U.S. Dollars as defined by the difference between the contract price and the benchmark price (or index) that is applicable for that maturity date. An FRA is an agreement to borrow or lend currency on a particular near date in the future for a predetermined time until a particular far date.

As a more particular example, in the case of a Forward Rate Agreement, a first party may have a near date of October 13th, a far date of October 27th, an amount of five million units of appropriate currency, and a price of 112 total points (i.e., 1.12%), and may desire to minimize the risk associated with that agreement by making a risk-offsetting agreement. A second party may desire to buy an FRA with a near date of October 13th, a far date of October 15th, an amount of five million units of the appropriate currency, and a price of 16 total points, and a third party may desire to buy an FRA with a near date of October 15th, a far date of October 27th, an amount of five million units of the appropriate currency, and a price of 96 total points. In this scenario, it would be desirable to be able to match the buying and selling requirements of each of the parties so that the desired transactions could be completed.

Similarly, consider the case of time-share rights in a vacation property. A first party may own the rights to possession of the property from July 1st through July 15th, and may desire to sell the rights to that property as a single block. A second party may desire to purchase only the rights in that property for the period from July 1st through July 7th, and a third party may desire to purchase only the rights in that property for the period from July 8th through July 15th. In such a scenario, neither the second party nor the third party may be willing to purchase the rights in the property for the entire period from July 1st through July 15th because it is for more time than each desires. Also, in this scenario, the first party may by unwilling to initially sell the rights in the property to either the second party or the third party because of a fear that the rights in the property for the remaining time may hence go unsold. Thus, because the desires of the parties are unmatched, none of the parties can complete the transaction in the property.

Obviously, the examples used to illustrate the matching difficulties in transferring items that are discussed above are fairly simple, and more complex scenarios could be contemplated by one of ordinary skill in the art, for example, such as a hypothetical case where a set of a dozen mis-matched purchases and sales of FRAs are desired. In such more complex scenarios, the principles of the present invention set forth below are equally applicable.

In view of the foregoing, it is an object of this invention to provide systems and methods for matching desired purchases and sales of mis-matched items.

SUMMARY OF THE INVENTION

In accordance with the principles of the present invention, systems and methods for matching desired purchases and sales of mis-matched items are provided. These systems and methods compare the requirements of potential buyers and sellers of items against those of sets of other potential buyers and sellers of items to construct transaction sets that will enable an optimal transaction or set of transactions for the parties involved. The present invention may be used to match purchases and sales of any items, such as goods, services, financial instruments, and property interests (e.g., ownership interests in real property, possessory interests in personal property, etc.).

In one embodiment of the present invention, a potential buyer or seller is first asked to identify an item that the party wishes to buy or sell. This identification may include information which can uniquely identify the item, and describe traits and parameters of the item. For example, with an NDFS, the party may identify that the NDFS has a given near date trait, a given far date trait, and a particular market convention parameter. The market convention may be fixing days, settlement days, average days, or any suitable day count convention. The party may also indicate the price parameter (based upon price per day, total bid/offer, or yield curve, for example), the amount parameter, and whether the party intends to buy or sell.

Next the party could indicate customer preferences such as counter-parties with which the customer wishes not to trade, counter-parties with which the customer will only trade, the maximum number of ways in which the customer would like matches to be generated, tolerances on the matching of the prices, whether to limit the matches reported to the party to those with the maximum price benefit to the party, with the maximum amount matching, with the minimum time gaps, or any other suitable preferences.

Then, from the information entered, the systems and methods may generate modified traits for the item. In the example above, this may include dates associated with the NDFS, such as dates for valid business days for the requested market convention. Once this and any other required data is generated, the systems and methods may then execute the matching process. In the matching process, traits and modified traits (e.g., buy and sell dates) may be classified into groups (e.g., based upon date position and whether the dates are buy or sell dates), and then sorted. Also, the traits may be converted into other traits to facilitate matching. For example, to facilitate matching between NDFSs with differing date conventions, the present invention may convert the buy and sell dates to dates in a standard convention or to dates in another convention prior to matching. Traits (e.g., buy dates) of items are then matched with corresponding or substantially corresponding traits (e.g., sell dates) of other items, and a list of potential combinations of transaction matches is established to achieve the desired transaction. Finally, the matches may be manually or automatically transacted, and those transactions may be confirmed as having been completed.

BRIEF DESCRIPTION OF THE DRAWINGS

Further features of the invention, its nature and various advantages will be more apparent from the following detailed description of the preferred embodiments, taken in conjunction with the accompanying drawings, in which like reference characters refer to like parts throughout, and in which:

FIGS. 1, 3, 9, and 16 are illustrations of switch entry and matching settings displays that may be generated in accordance with certain embodiments of the present invention;

FIG. 2 is an illustration of a customer information entry display that may be generated in accordance with one embodiment of the present invention;

FIGS. 4, 5, 7, 11, and 17 are illustrations of switch listing displays that may be generated in accordance with certain embodiments of the present invention;

FIGS. 6, 8, 10, and 12-15 are illustrations of match listing displays that may be generated in accordance with certain embodiments of the present invention;

FIG. 18 is an illustration of a match transaction confirmation display in accordance with one embodiment of the present invention;

FIG. 21 is a table illustrating a data structure that may be used in a matching process in accordance with one embodiment of the present invention.

DETAILED DESCRIPTION OF THE PREFERRED EMBODIMENTS

The present invention is now described in more detail in conjunction with preferred embodiments which are illustrated in FIGS. 1-22.

Figure 1:
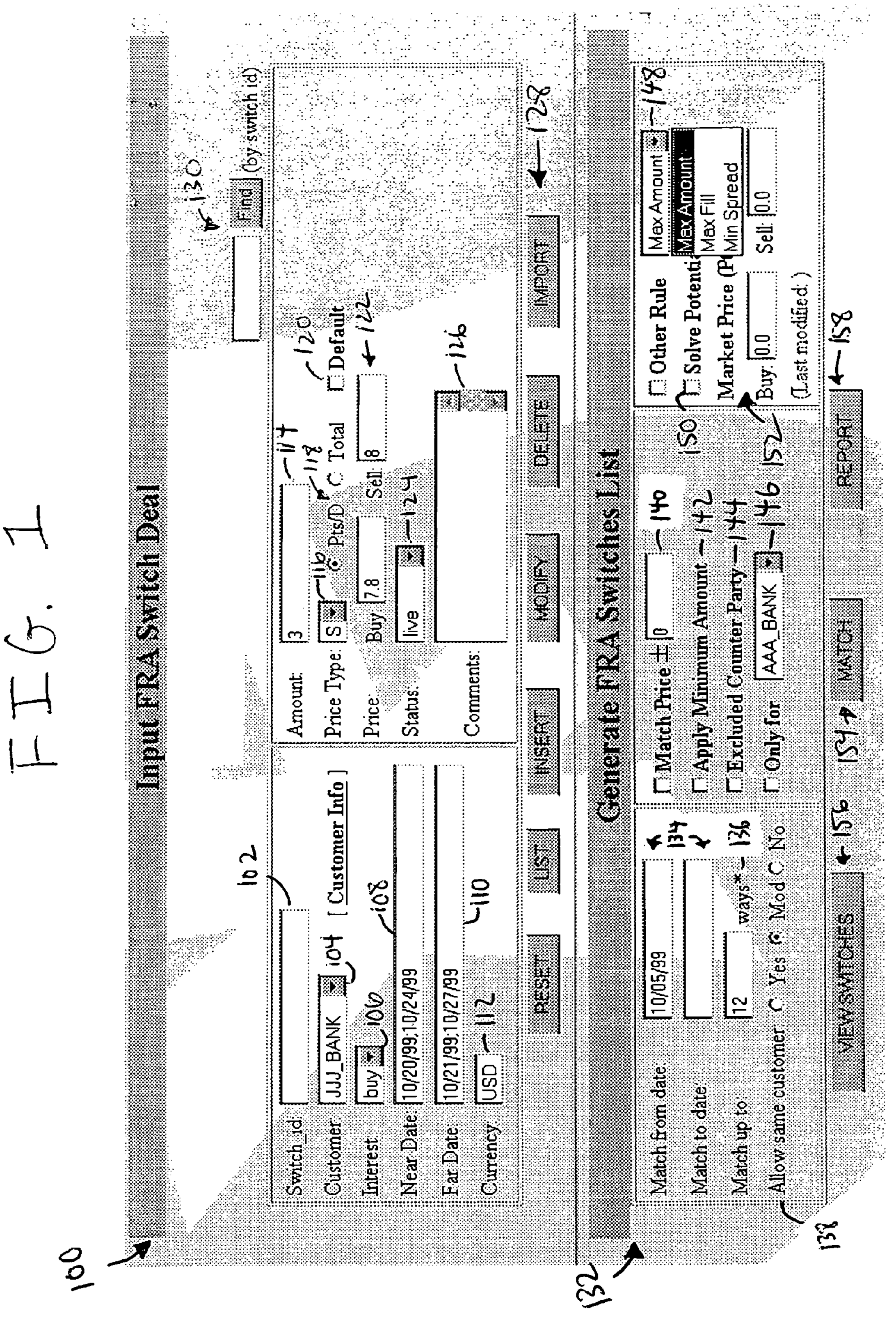

Turning to FIGS. 1-18, examples of screen displays that may be presented in certain embodiments of the present invention are illustrated. FIG. 1 illustrates an "Input FRA Switch Deal" window 100. In this window, a party can enter information regarding an FRA switch that the party desires to buy or sell. As can be seen, this information may include an identifier 102, a customer name 104, whether the party wants to buy or sell 106, one or more near dates 108, one or more far dates 110, a currency 112, an amount 114, a price convention 116, whether the price is based on points per day or total points 118, whether to use a default price 120, buy and sell prices 122 if a default price is not to be used, the status 124 of the FRA for matching (i.e., whether it is available to be matched (live), no longer available to be matched (pending), or being removed from the matching system (deleted)), and any comments 126. Also within window 100, a party can use buttons 128 to reset or clear window 100, present a list of FRA switch identifiers for switches entered into the matching system, insert the display switch as a new switch, modify an entered switch with changes made in window 100, delete the displayed switch, or import switch information from another application or a file. To get switch information for a particular switch, a party can search for the switch by entering a switch's identifier in find field 130. Once found, the switch's information will be displayed in window 100.

The party can also enter limits for the matching process, enter filters and settings that modify how the matches are generated and displayed, initiate the matching process, view switches entered in the system, and generate switch match reports using a "Generate FRA Switches List" window 132 that is also shown in FIG. 1. Limits may include a range of match dates 134, a limit on the number of ways matches are formed 136, and whether to allow the same party to participate in a match twice (yes), prohibit the same party from participating in a match twice (no), or prohibit the same party from having matching buy and sell dates in a match (mod) 138. Filters include a tolerance on the match price 140, whether a minimum amount per matching transaction is required 142, whether to exclude certain counter-parties 144, whether to include only certain counter-parties 146, whether certain other rules 148 apply (such as whether to rank matches based upon which matches would transact the maximum amount (maximum amount rule), which matches involve the maximum number of customers (a maximum fills rule), which matches give the best price matching (a minimum spreads rule), and which matches give the largest commission), and whether to solve potential matches 150 by looking for FRAs that can be created to enable one or more matches to occur or that can be created to form a match that will provide a benefit that wouldn't have otherwise existed. The default buy and sell prices for those switches that are designated as using default pricing using entry 120 may be entered by the operator in field 152. Matching may be initiated by pressing button 154. A list of switches and the corresponding switch information, such as that displayed in FIG. 5, may be displayed by pressing button 156. Finally, a report of switch matches, such as that in FIG. 6, may be generated by pressing button 158. Another illustration of these windows is shown in FIG. 3.

Although not shown in FIG. 1, the present invention may also enable a party to specify whether the execution of any proposed matches containing one or more switches is conditional upon the simultaneous, prior, or subsequent execution of proposed matches containing one or more other switches. For example, a party may only be willing to execute matches when at least five of a set of ten switches that that party would like to match are in fact matched. In such a case, when given the option to execute matches, a user of the present invention may be required to indicate that that user would like to execute matches containing all of the required switches before any of matches containing those switches is executed.

Also, although a particular set of matching limits, filters, and settings are shown, the present invention may be implemented with any suitable additional or alternative limits, filters, and/or settings.

FIG. 4 shows a partial view of a display of switches entered into one embodiment of the present invention. As can be seen, a summary 400 of the FRA switch information that was entered into window 100 of FIG. 3 is displayed. Also, displayed is an indication of the day count 402 for each price convention given the appropriate holidays, etc., and a total price 404 given the day count 402 and price 122 for the switch (FIG. 3).

As shown in FIG. 2, an "Input FRA Customer Info" window 200 is illustrated. The information entered in this window may include a customer identifier 202, a full customer name 204, an abbreviated customer name 206, a minimum amount of currency per transaction 208, a list of excluded counter-parties 210 and 212, a status for the customer 214 (active or suspended), a customer contact 216, a customer phone number 218, and any comments 220. Using buttons 222, a party may reset or clear the information displayed in window 200, enter the information in window 200 as a new customer, modify an existing customer with the information displayed in window 200, delete the customer corresponding to the displayed information, or view a list of customer identifiers. To retrieve a customer's information, a party may enter the customer's identifier in field 202 and press the "Find" hypertext 224. To return to the display of FIG. 1, a party may press "Go To Switch Match" hypertext 226.

FIG. 5 shows a more complete view 500 of the display of switches entered into the embodiment of the present invention that is illustrated in FIG. 4. As shown, four switches 502, 504, 506, and 508 have been entered. By pressing "MATCH" hypertext 510, a party can initiate matching on the four switches in the system. The party can also delete one or more switches by selecting the switch in column 518 and pressing "DELETE" hypertext 512. The party can sort the list based upon the characteristic in any of the columns displayed by pressing the corresponding column heading hypertext 516. Advanced sorting that may involve sorting by the characteristics of multiple columns may be effected by pressing the "ADVANCED SORT" hypertext 514.

As shown by the arrows 520 displayed in FIG. 5, when matching is performed on switches 502, 504, and 506, these switches will form a transaction match. This fact is more clearly shown in FIG. 6. As illustrated, these switches form match "M01" as indicated in fields 602, 604, 606, and 608. Column 610 indicates that the switches in match "M01" have a net price differential of zero because the combined two buy prices 612 and 614 match the sell price 616. Also shown in FIG. 6 is the fact that switch 618 cannot be matched with any other of the switches entered into the matching system. FIG. 6 further illustrates that after a match has been transacted, the present invention may confirm the transaction as shown in portion 620.

FIG. 7 illustrates a larger list 702 of FRA switches to be matched than that shown in FIG. 5. Here the switches indicated by arrows 704, i.e., switches 706, 708, and 710, form a matched set. As can be seen more easily in FIG. 8, these switches correspond as to their near and far dates and form a match "M01". As indicated in field 802, this match represents an inverted market because the buyer (switch id. 000235) is willing to pay more (160) than the total that the sellers (switch ids. 000533 and 000550) are asking for (144). When there is such an inverted market, the present invention may provide the buyer with the benefit (i.e., give the buyer a price of 144), provide the sellers with the benefit (i.e., give the sellers a total price of 160), or split the price difference between the buyer and sellers using any suitable method (e.g., split the price difference evenly at 152). The present invention may alternatively use the value in the price difference to enable another switch to be added to the match (e.g., by extending the near or far date on one or more of the switches to allow other switches to participate in the match).

As should be clear from the previous example, the present invention preferably does not require that the total buy and sell prices for the switches to match in order for a match to be formed. Nevertheless, the present invention could be implemented so that price matching, or matching of any other characteristic of the items, is required.

Figure 9:
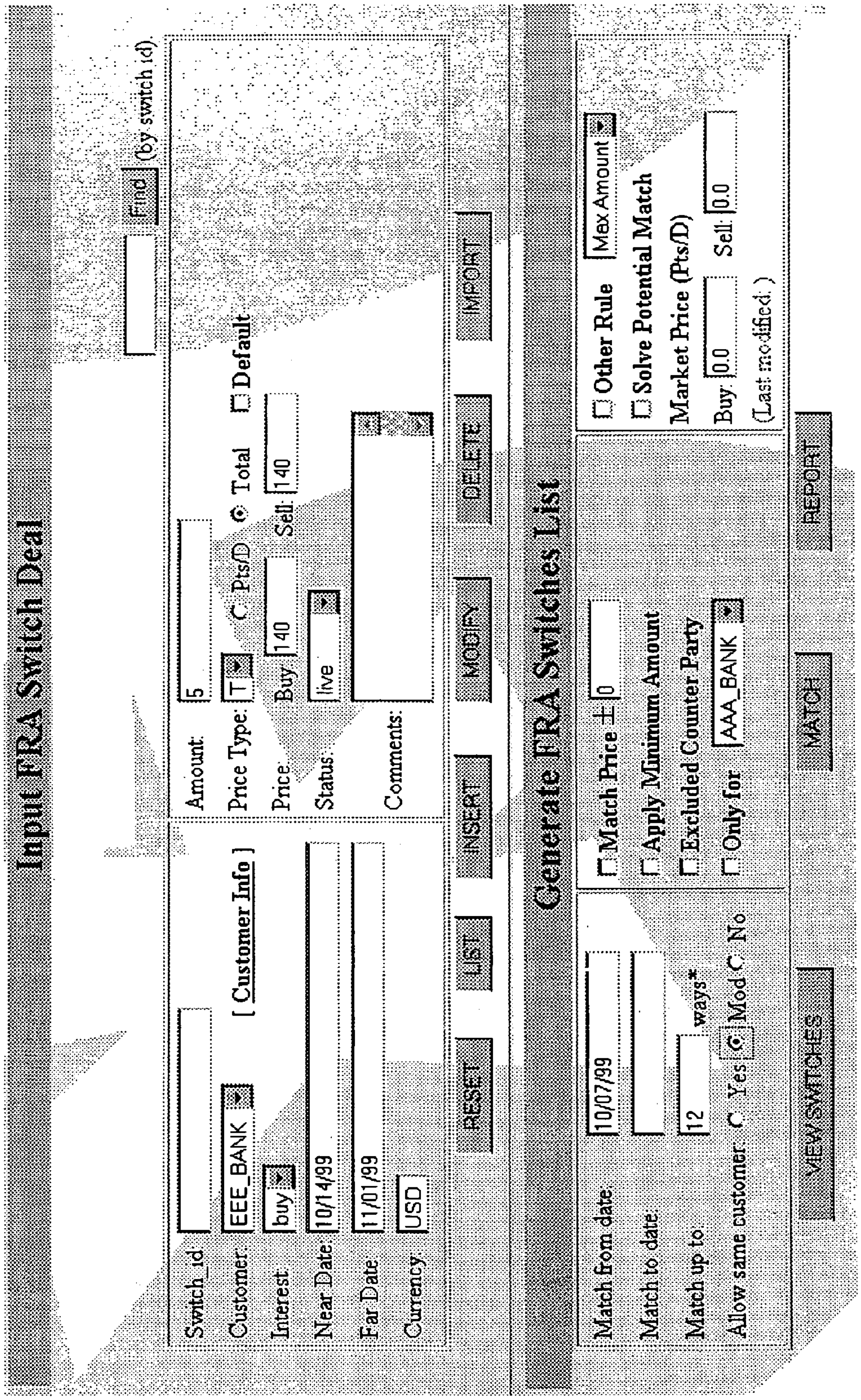

FIG. 9 shows that a new FRA switch entry has the same parameters except for price as that in switch id. 000235 shown in FIG. 8. In this case, the present invention may determine which FRA switch takes priority when trying to match these switches with other switches in the matching system. As shown in portion 1002 of FIG. 10, the present invention may select switch id. 000235 because the switch has a higher buy price (i.e., the buyer is willing to pay more money). As shown in portion 1004 of FIG. 10, the present invention may also simply list all of the transaction matches and allow the user to select the desired match. As yet another possibility, the invention may base preference in selecting switches on order of entry.

FIG. 11 shows yet another match list that could be analyzed by the present invention. As shown in FIG. 12, a variety of transaction matches 1202, 1204, 1206, 1208, and 1210 (M01-M05) can be constructed from this list. Also shown in column 1212 of FIG. 12 are the other matches in which each particular switch indicated in the corresponding row would be used, and thus which matches are mutually exclusive.

Figure 13:
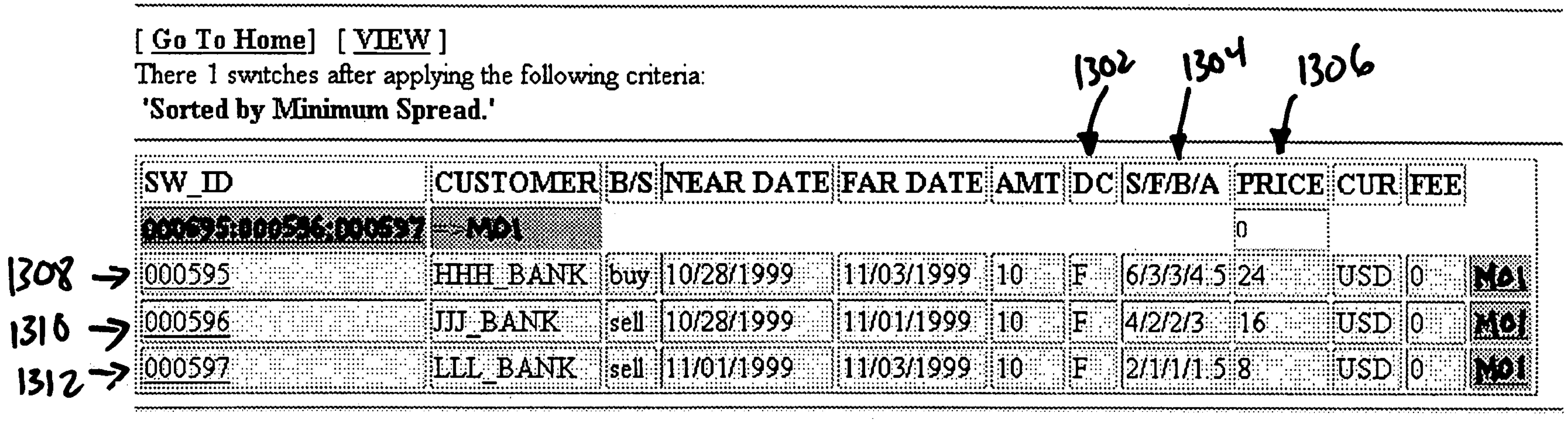

Turning to FIG. 13, it can be seen that for each of the switches with near and far date pairs shown, the number of "fixing days" or day count for the FRA switches are calculated as 3, 2, and 1 (see column "DC" 1302 to see that each switch is an "F" type date convention and column "S/F/B/A" 1304 to see that each day count is 3, 2, and 1 for "F") for switches 1308, 1310, and 1312, respectively. In these FRA switches, because the price is set based upon points per day a per day amount of 8 points, the total price is calculated as 24, 16, and 8 points, respectively, as shown in column 1306. Similarly, in FIG. 14, settlement days are used in the date convention shown in the "DC" column 1402, and accordingly 6, 4, and 2 settlement days for each of switches 1408, 1410, and 1412 are determined as being applicable as shown in column 1404. Based on these numbers of settlement days, and the price being set at 8 points per settlement day, the switches have prices of 48, 32, and 16 points, respectively, as shown in column 1406. Although the date convention for a matched set can be uniform as shown in FIGS. 13 and 14, the date conventions can also be entered in mixed formats and the present invention will calculate the corresponding prices and forms matches as shown in FIG. 15.

Turning to FIG. 16, a switch with a default price entry selection is shown. More particularly, the switch is designated as using the default system price by having a check in box 120 of FIG. 16. When matching is performed on this switch, the present invention preferably will retrieve the appropriate price (in this example, the buy price) from the default buy and sell prices entered in fields 152. In this way, many switches that all use a default price could be entered into a matching system in accordance with the present invention, and the market price can be easily submitted at the time of matching without having to manually adjust the price for each switch. As shown in column 1702 of FIG. 17, when multiple switches are displayed, each switch could be indicated as using the default price or not. In this case, an asterisk is present next to each price that is calculated using the default price.

Once a party has viewed the various transaction matches generated by the present invention, the party could elect to transact a transaction match by clicking on the match id. hypertext 1502 shown in FIG. 15. Alternatively, qualifying matches could automatically be transacted by the present invention without requiring party intervention. After a match has been transacted, the customers involved in the transaction may be automatically notified using any suitable mechanism, such as email. Also after the match has been transacted, the invention may present a display 1800 such as that shown in FIG. 18. As illustrated, the matched switches in the match (switches 1802 and 1804) and a transaction date and time 1806 may be shown. A field 1808 may also be available to document notes relating to the transaction. The party may further be given an opportunity to reverse the transaction by selecting "UNMATCH" hypertext 1810.

As is evident from the illustrations above, with certain types of items, such as NDFSs and FRAs, the present invention can "break up" the legs associated with the items, and then match those legs in any way. For example, with an FRA where a party is obligated to deliver currency on a near date and then is entitled to receive currency on a far date, and that party wants to sell the obligations and entitlements under that FRA, the present invention can separate the obligation to deliver currency from the entitlement to receive currency. In such a case, for the obligation leg, the present invention may simply look for a corresponding leg in another item where a potential counter-party wants an obligation to deliver currency. And, for the entitlement leg, the present invention may simply look for a corresponding leg in the other item, or in yet another item, where the potential counter-party, or any other party, wants an entitlement to receive currency.

Figure 19:
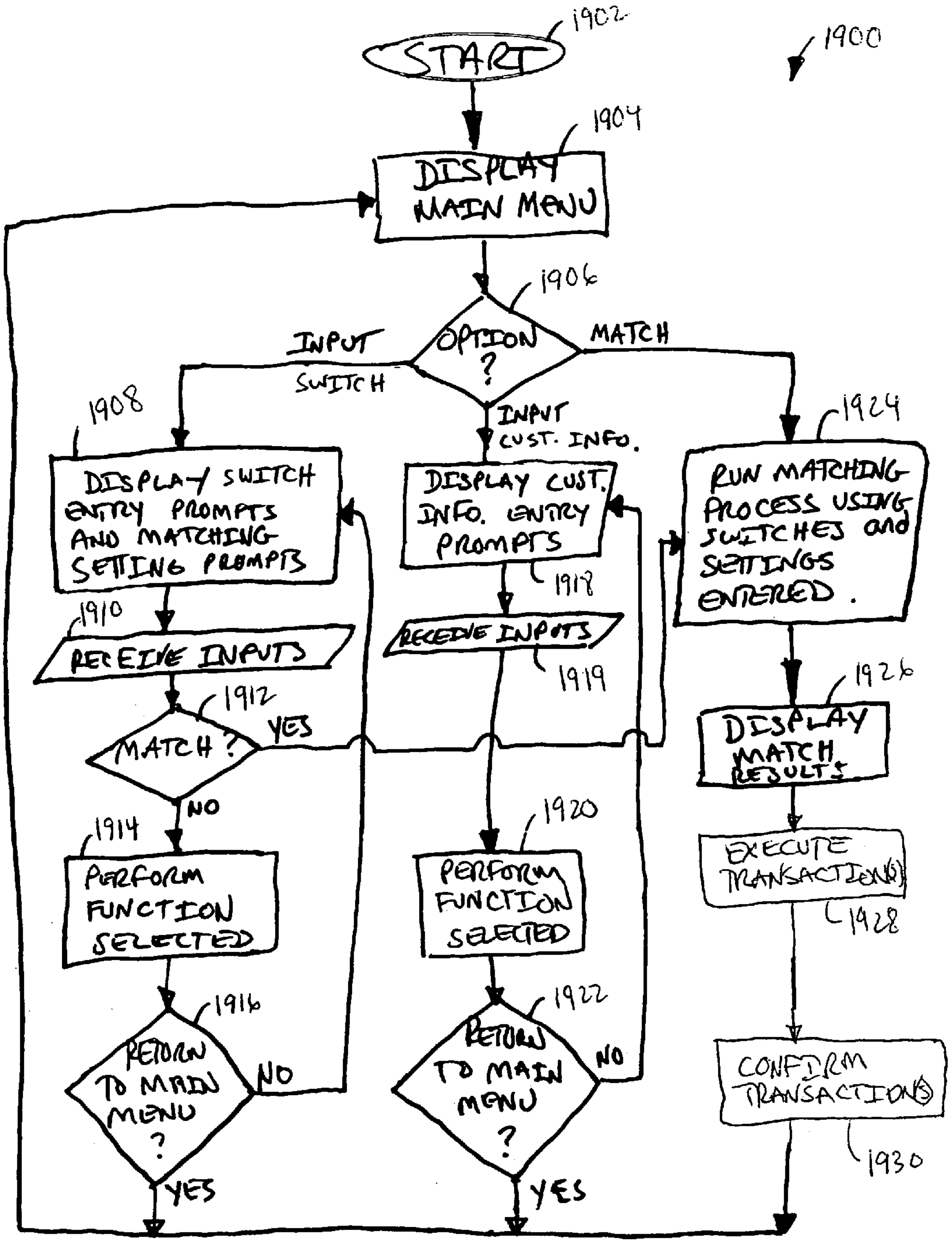
FIG. 19 is a flow diagram of a process that may be used to perform the functions illustrated in FIGS. 1-18 in accordance with certain embodiments of the present invention.

One embodiment of a process 1900 that could be used to perform the functions illustrated in FIGS. 1-18 is shown in FIG. 19. As can be seen, once process 1900 begins at step 1902, the process displays a main menu at step 1904. This main menu may include options to input a switch, input customer information, and initiate a matching process. At step 1906, process 1900 determines if any of these options have been selected, and if so, process 1900 branches accordingly. If the option to input a switch is selected, the process branches to step 1908 where switch entry prompts and matching setting prompts may be displayed. FIG. 1 illustrates an example of a screen that may be displayed at this point in process 1900. Next, process 1900 receives inputs at step 1910. These inputs may include responses to any of the prompts previously displayed at step 1908. At step 1912, the process determines whether matching has been selected, and, if so, process 1900 branches to step 1924 to perform the matching process. If matching has not been selected, however, process 1900 performs any other functions that may have been selected at step 1914. These other functions may include finding a particular switch, resetting or clearing the prompts, listing entered switches, inserting a new switch, modifying an entered switch, deleting an entered switch, importing a switch, viewing the entered switches, or generating a report of the switches and/or matches. Once any functions may have been performed, process 1900 determines at step 1916 whether to return to the main menu or continuing receiving switch entries and match settings. If it is determined at step 1916 that the main menu is to be displayed, process 1900 branches back to step 1904. Otherwise process 1900 branches to step 1908.

If the option to input customer information is determined to have been selected at step 1906, process 1900 branches to step 1918 where customer information entry prompts may be displayed as illustrated in FIG. 2, for example. Next, at step 1919, process 1900 receives inputs in response to the prompts displayed in step 1918. Once these inputs have been received, any functions selected in response to these prompts may be performed at step 1920. Such functions may include resetting or clearing the prompts displayed in step 1918, inserting new customer information, modifying existing customer information, deleting existing customer information, viewing a list of entered pieces of customer information, and finding a particular customer's or set of customers' information. Once this function has been performed, process 1900 determines whether to return to the main menu at step 1922. If it is determined at step 1922 that the main menu is to be displayed, process 1900 branches back to step 1904. Otherwise process 1900 branches to step 1918.

Figure 20:
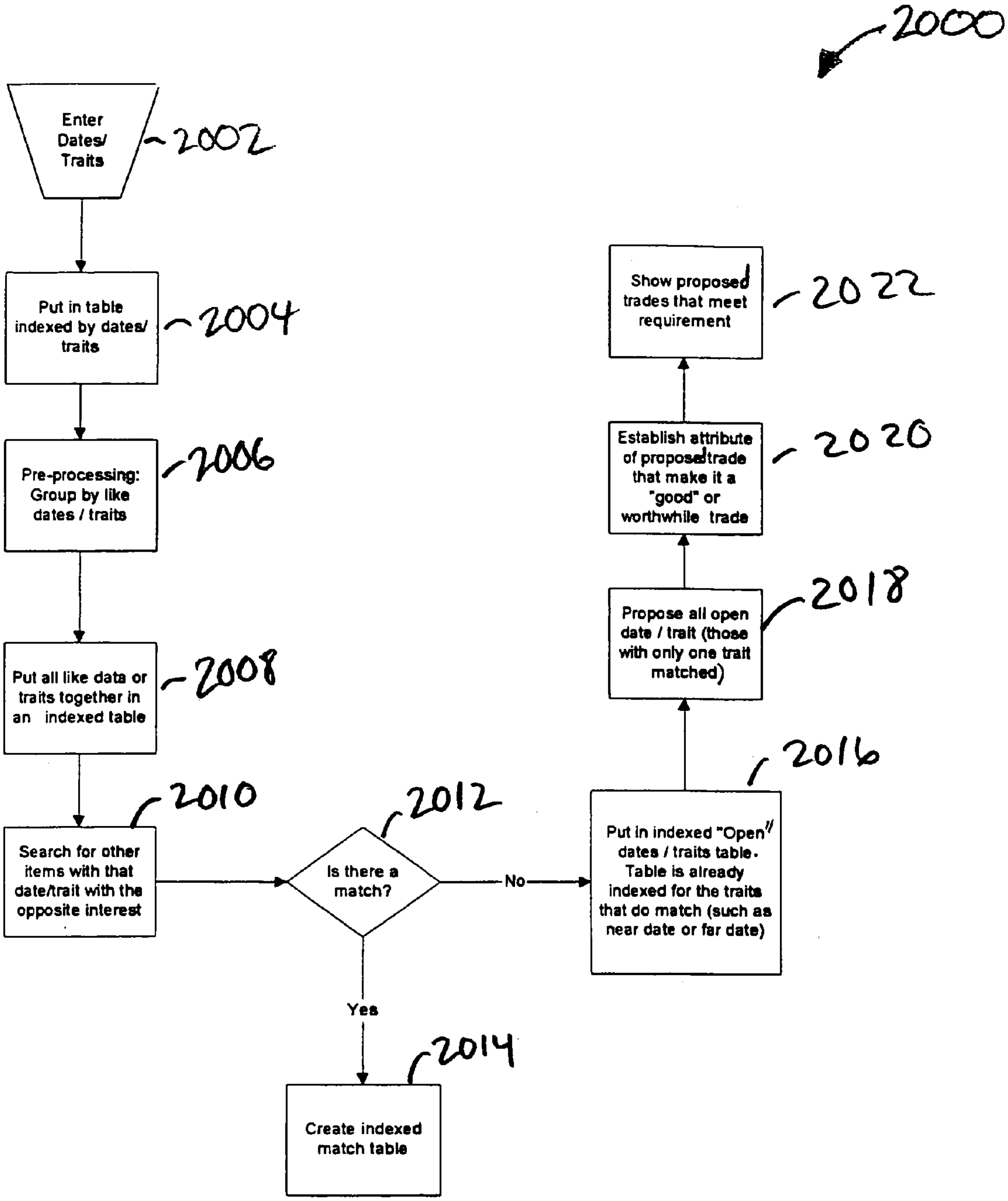
FIG. 20 is a flow diagram of a process for matching for proposing items to complete matches (i.e., a solver) in accordance with one embodiment of the present invention.

Finally, if the option to initiate the matching process is determined to have been selected at step 1906, process 1900 may branch to step 1924 where the matching process may be performed as discussed above in connection with FIGS. 1-18. An example of a process for matching and for proposing items to complete matches (i.e., a solver) is shown in FIG. 20. Once the matching process has been completed, the match results may be displayed at step 1926 as illustrated in FIGS. 6, 8, 10, and 12-15. After the match results have been displayed, process 1900 may execute one or more of the transaction matches at step 1928. As is stated above, execution may be manually or automatically initiated. Once the matches have been executed, process 1900 may then confirm at step 1930 the transactions as shown in FIG. 18. This confirmation may include notifying the party running the matching process and/or the customers to the transaction. Finally, after the transactions have been confirmed, process 1900 may loop back to the main menu at step 1904.

Turning to FIG. 20, a process 2000 for matching and for proposing items to complete matches (i.e., a solver) is shown. As illustrated, at step 2002 items with specific traits and parameters are entered into the matching process. In the case of the items being switches as discussed above, these switches may be entered as shown in FIG. 1, the traits may be near and far dates, and the parameters may be buy/sell intentions for the switches. Next at step 2004, the items are put into a table that is indexed by the traits and parameters. Such a table may be implemented in an SQL database. Next at steps 2006 and 2008, the items are grouped by like items into one or more other tables. Like items include items that may be exchanged for each other. For example, in the case of switches as illustrated above, like items may include switches for corresponding currencies. These steps are preferably performed to speed the subsequent matching process.

An illustration of a table 2100 that may be generated through the processing of steps 2004 and 2006 is shown in FIG. 21. As can be seen, table 2100 includes trait and parameter information for eight switches 2101-2108. For each of switches 2101-2108, a buy/sell intention parameter ("Buy" or "Sell"), a near date trait ("N") and a far date trait ("F") are indicated. As illustrated, the dates are numbered 1-10. This choice of date designation is merely for purpose of illustration and any suitable date designation scheme may be implemented in accordance with the present invention. Also shown is a proposed switch 2110 that may be used to complete a match of some of the switches shown in table 2100.

Referring back to FIG. 20, process 2000 next searches through the items in each table for items that have matching traits but with opposite interest at step 2010. In the case of switches 2101-2108 illustrated in FIG. 21, this would involve searching through the switches for switches with a matching date designation but an opposite buy/sell intention. More particularly, for example, switch 2101 might be matched with switch 2103 because they have corresponding date traits and opposite buy/sell intentions. When matching first starts, a first item will be selected. That first item will then be compared to subsequent items with a matching trait and opposite interest. For example, switch 2101 would be compared to switches 2103 and 2108 because their near dates match and their buy/sell intentions are opposite. For the comparisons made, the matching process then looks for other items that can close the match. For example, with switches 2101 and 2108, the process would then look for one or more switches to close the far dates on each.

In performing steps 2004, 2006 and 2008, and 2010, process 2000 may apply limits to the items processed at any of these steps to keep processing to a desired level. As shown with limits 134, 136, and 138 of FIG. 1, such limits may include a range of match dates, a limit on the number of ways matches are generated, and whether to allow same customer matches. For example, when performing step 2004, process 2000 may only put only switches withing a range of match dates into the initial table. Alternatively, process 2000 may only apply the range of match dates in subsequent steps.

Next at step 2012, process 2000 then determines for each proposed match whether the match was closed. If so, then at step 2014 an indexed match table is created for the match. This match table may then be available for viewing as shown in FIG. 6 or processing in order to execute the match transaction.

However, if a match is determined to not be closed at step 2012, then process 2000 proceeds to step 2016 to look for possible solutions to the match. This part of the process 2000 implements one embodiment of the "solver" function of the present invention. As shown, at step 2016, process 2000 puts the open match items in an "open" traits table. Next at step 2018, the process proposes one or more items to close the match. These items will have traits that match other items in the match that previously only had one trait matched. Then process 2000 determines one or more attributes of the proposed item that will make the match desirable at step 2020. In order to be desirable, these attributes should make the match better in at least one regard than another proposed match or a closed match stored in a match table at step 2014. Finally, at step 2022, process 2000 presents one or more proposed matches to a user who can then decide whether or not to create one of the corresponding items in order to close the open match. Each of the proposed matches may be indicated as having a quality that makes that match different from another match (e.g., such as having a higher or lower commission).

An example of the processing of the "solver" portion of the matching process is illustrated in FIG. 21. Referring to switches 2106-2108, it can be seen that the near dates for switches 2106 and 2108 match and the far dates for switches 2107 and 2108 match. The far date of switch 2106 and the near date of switch 2107, however, are open. In order to complete the match, process 2000 may propose creating a switch 2110 to sell with a near date that matches the far date of switch 2106 and a far date that matches the near date of switch 2107. In this way, proposed switch 2110 could be used to complete the match.

Alternatively or additionally to proposing switches that could be used to close a match, the present invention may determine the best available existing switch that could be used to close the match as much as possible. For example, the invention may find an existing switch that has a near date that matches an open far date and a far date that is only one day off from an open near date.

Once matches are formed, the present invention may apply filters to the matches. As explained in connection with FIG. 1, these filters may include requiring a tolerance on the match price, a minimum amount per matching transaction, an exclusion of certain counter-parties, an inclusion of only certain counter-parties, ranking matches based upon which matches would transact the maximum amount, ranking matches based upon which matches involve the maximum number of customers, ranking matches that give the best price matching, and ranking matches based upon which matches give the largest or smallest commission or markup or markdown.

As will be evident to one of ordinary skill in the art, the present invention can be implemented on a wide variety of computer systems and networks. In one embodiment, the present invention could be implemented on a single computer or processor, wherein all of the data entry, processing, and display is done on the single computer or processor. In other embodiments, the present invention could be implemented on two or more computers communicating over one or more computer networks. These networks could be local area networks, wide area networks, the Internet, or any other suitable network. In such embodiments, the processing may be performed by a server or processor on the network and the data entry and display may be performed by computers and/or browsers connected to the network and in communication with the server or processor.

Figure 22:
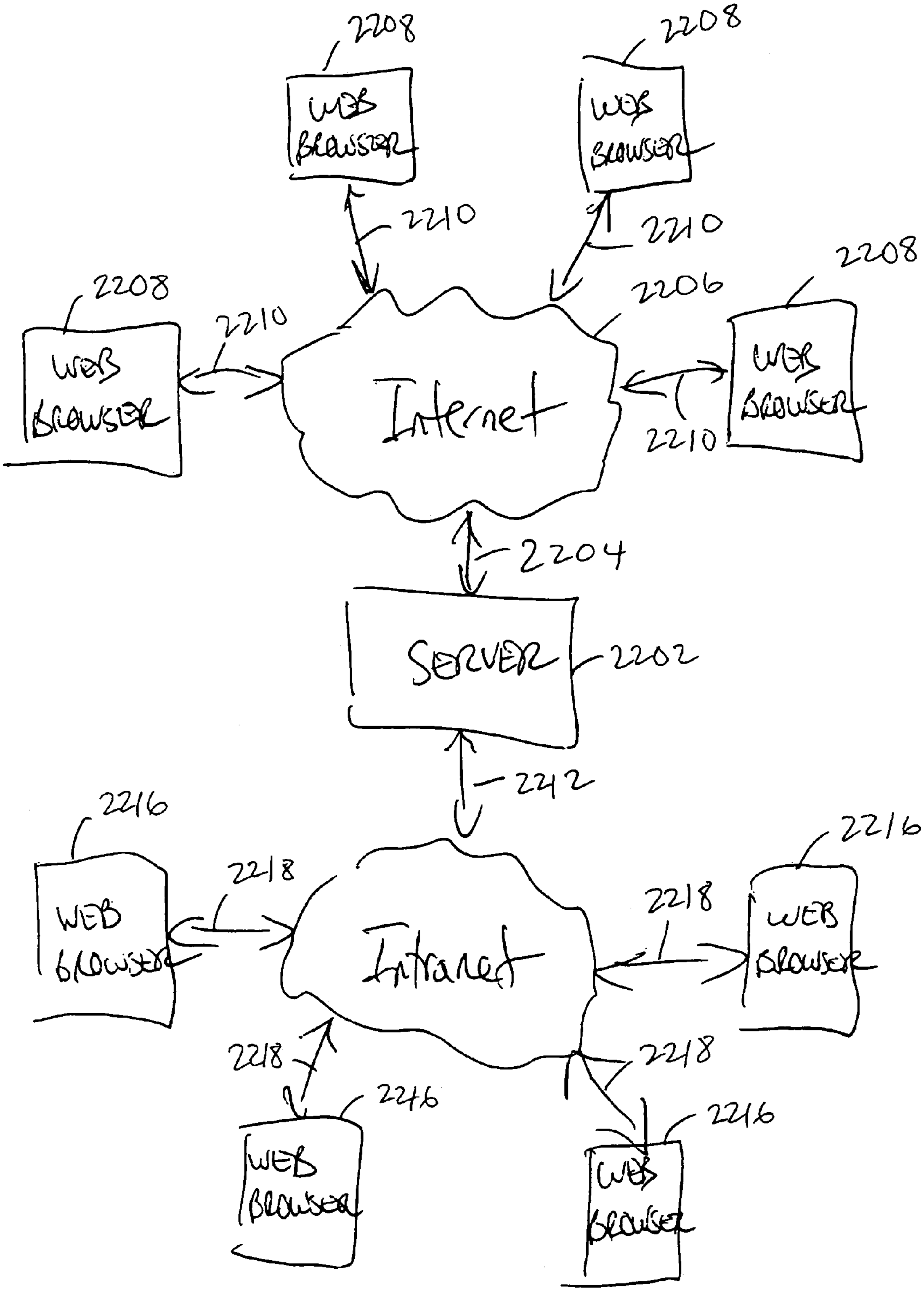
FIG. 22 is a block diagram of a system that may be used to implement the processes and functions illustrated in FIGS. 1-21 in accordance with certain embodiments of the present invention.

One example of a system 2200 for implementing the present invention is shown in FIG. 22. As illustrated, system 2200 may include a server 2202 that is connected by a communication link 2204 to the Internet 2206 and/or that is connected by a communication link 2212 to an Intranet 2214. When implemented with the Internet 2206, one or more web browsers 2208 may be coupled to server 2204 through the Internet and communication links 2210. When implemented with an Intranet 2214, one or more web browsers 2216 may be coupled to server 2204 through the Intranet and communication links 2218.

In system 2200, server 2202 may be any suitable server, processor, computer, or data processing device, or combination of the same. Internet 2206 and Intranet 2214 may be any suitable computer networks and may include any suitable computer network equipment. Web browsers 2208 and 2216 may be any suitable web browsers or display terminals, and may implemented as software running on general purpose computers, as dedicated hardware, or in any suitable manner. Finally, communication links 2204, 2210, 2212, and 2218 may be any suitable mechanisms for coupling server 2202 to Internet 2204, Intranet 2214, and/or web browsers 2208 and 2216. These mechanisms may include dial-up connections, dedicated connections, cable modems, digital subscriber lines, T1 connections, T3 connections, etc.

It will be understood that the foregoing is only illustrative of the principles of the invention and that various modifications can be made by those skilled in the art without departing from the scope and spirit of the invention, which is limited only by the claims that follow.

What is claimed is:

1. A method for matching a purchase or sale of a first item with a respective sale or purchase of a second item and a third item, wherein each of the first item, the second item, and the third item has a first date and a second date, the method comprising:

receiving first information relating to the purchase or sale of the first item, second information relating to the respective sale or purchase of the second item, and third information relating to the respective sale or purchase of the third item, wherein the first information indicates whether the first item is to be bought or sold, the second information indicates that the second item is to be respectively sold or bought, and the third information indicates that the third item is to be respectively sold or bought, and wherein the first information, the second information, and the third information respectively define the first date and the second date of the first item, the second item, and the third item such that the first and second items are mis-matched, the first and third items are mis-matched and the second and third items are mis-matched;

using a processor to determine that the first date of the first item occurs within a time period from the first date of the second item, and that the second date of the second item occurs within a time period from the first date of the third item; and designating the first item, the second item, and the third item as forming at least a portion of a transaction match when the first date of the first item occurs within a time period from the first date of the second item, and the second date of the second item occurs within a time period from the first date of the third item.

2. The method of claim 1, wherein the first item, the second item, and the third item are each Forward Rate Agreements, wherein each first date is a near date, and wherein each second date is a far date.

3. The method of claim 1, wherein the first item, the second item, and the third item are each Non-Deliverable Forward Spreads, wherein each first date is a near date, and wherein each second date is a far date.

4. The method of claim 1, wherein each of the first item, the second item, and the third item is a financial instrument.

5. The method of claim 1, wherein each of the first item, the second item, and the third item is an interest in property.

6. The method of claim 1, wherein at least one of the first information, the second information, and the third information includes at least one parameter, and wherein the method further comprises determining at least one other parameter using the at least one parameter, the first date, and the second date for at least a corresponding one of the first item, the second item, and the third item.

7. The method of claim 6, wherein the at least one parameter includes a date convention, and the at least one other parameter includes a day count.

8. The method of claim 1, wherein at least one of the first item, the second item, and the third item has a prohibition against being bought from or sold to at least one specified party, and wherein at least one of the first item, the second item, and the third item is not designated as forming part of the transaction match when the transaction match would violate the prohibition.

9. The method of claim 1, wherein at least one of the first item, the second item, and the third item has a requirement of only being bought from or sold to at least one specified party, and wherein the at least one of the first item, the second item, and the third item is not designated as forming part of the transaction match when the transaction match would violate the requirement.

10. The method of claim 1, wherein at least one of the first item, the second item, and the third item has a requirement of only being bought or sold as at least a minimum amount, and wherein the at least one of the first item, the second item, and the third item is not designated as forming part of the transaction match when the transaction match would violate the requirement.

11. The method of claim 1, wherein the first date and the second date of each of the first item, the second item, and the third item define limits of ranges associated with the first item, the second item, and the third item, and wherein the method further comprises not designating at least one of the first item, the second item, and the third item as part of the transaction match when a corresponding first date or second date is below a lower limit of an acceptable range for matching.

12. The method of claim 1, wherein the first date and the second date of each of the first item, the second item, and the third item define limits of ranges associated with the first item, the second item, and the third item, and wherein the method further comprises not designating at least one of the first item, the second item, and the third item as part of the transaction match when a corresponding first date or second date is above an upper limit of an acceptable range for matching.

13. The method of claim 1, further comprising generating transaction matches that include other items, and limiting the number of transaction matches that are generated to a specified number.

14. The method of claim 1, further comprising not designating the first item, the second item, and the third item as forming part of the transaction match when the transaction match would involve a specified party participating in the transaction match twice.

15. The method of claim 1, further comprising not designating the first item, the second item, and the third item as forming part of the transaction match when the transaction match would involve a specified party purchasing an item having a first date that occurs within a time period from a second date of another item being sold by the specified party.

16. The method of claim 1, further comprising not designating the first item, the second item, and the third item as forming part of the transaction match when the transaction match would have a net price that is outside a specified tolerance.

17. The method of claim 1, further comprising determining the first date and the second date of at least one of the first item, the second item, and the third item in order to form a transaction match.

18. The method of claim 1, wherein at least one of the first item, the second item, and the third item uses a default price, and wherein the method further comprises applying the default price to the at least one of the first item, the second item, and the third item when designating the first item, the second item, and the third item as forming at least a portion of the transaction match.

19. The method of claim 1, further comprising generating a second transaction match that is at least in part formed from a fourth item and at least one of the first item, the second item, and the third item, and indicating which of that the transaction match and the second transaction match are mutually exclusive.

20. The method of claim 19, further comprising removing the transaction match from a set of matches that are available to be transacted if the second transaction match is transacted.

21. The method of claim 19, further comprising removing the second transaction match from a set of matches that are available to be transacted if the transaction match is transacted.

22. The method of claim 1, wherein a price associated with the first item does not match another price associated with both the second item and the third item, and wherein the method further comprises selecting a match price that is equal to the price associated with the first item.

23. The method of claim 1, wherein a price associated with the first item does not match another price associated with both the second item and the third item, and wherein the method further comprises selecting a match price that is equal to the other price associated with both the second item and the third item.

24. The method of claim 1, wherein a price associated with the first item does not match another price associated with both the second item and the third item, and wherein the method further comprises selecting a match price that is between the price associated with the first item and the other price associated with both the second item and the third item.

25. The method of claim 1, wherein the first date and the second date of one of the first item, the second item, and the third item matches a first date and a second date of another item, and wherein the method further comprises selecting one of the other item and the one of the first item, the second item, and the third item as to be restricted from the transaction match.

26. The method of claim 25, wherein the selecting is based upon an order of entry of the other item and the one of the first item, the second item, and the third item.

27. The method of claim 25, wherein the selecting is based upon which of the other item and the one of the first item, the second item, and the third item has a better price.

28. A system for matching a purchase or sale of a first item with a respective sale or purchase of a second item and a third item, wherein each of the first item, the second item, and the third item has a first date and a second date, the system comprising a computing device having a processor and a memory that:

receives first information relating to the purchase or sale of the first item, second information relating to the respective sale or purchase of the second item, and third information relating to the respective sale or purchase of the third item, wherein the first information indicates whether the first item is to be bought or sold, the second information indicates that the second item is to be respectively sold or bought, and the third information indicates that the third item is to be respectively sold or bought, and wherein the first information, the second information, and the third information respectively define the first date and the second date of of the first item, the second item, and the third item such that the first and second items are mis-matched, the first and third items are mis-matched and the second and third items are mis-matched, determines that the first date of the first item occurs within a time period from the first date of the second item, and that the second date of the second item occurs within a time period from the first date of the third item, and designates the first item, the second item, and the third item as forming at least a portion of a transaction match when the first date of the first item occurs within a time period from the first date of the second item, and the second date of the second item occurs within a time period from the first date of the third item.

* * * * *